(12) United States Patent
Kim et al.

(10) Patent No.: US 8,545,193 B2
(45) Date of Patent: Oct. 1, 2013

(54) FAN FOR AIR CONDITIONER

(75) Inventors: In Gyu Kim, Jinhae-si (KR); Byung Il Park, Changwon-si (KR); Ja Hyung Koo, Changwon-si (KR); Yang Ho Kim, Changwopn-si (KR); Kyeong Wook Heo, Changwon-si (KR); Si-Kyong Sung, Changwon-si (KR); Dong Hyuk Lee, Jinhae-si (KR); Young Ho Hong, Gimhae-si (KR); Tae Geun Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 1142 days.

(21) Appl. No.: 11/547,783

(22) PCT Filed: Aug. 19, 2004

(86) PCT No.: PCT/KR2004/002083
§ 371 (c)(1),
(2), (4) Date: Jul. 25, 2007

(87) PCT Pub. No.: WO2005/096714
PCT Pub. Date: Oct. 20, 2005

(65) Prior Publication Data
US 2008/0084140 A1    Apr. 10, 2008

(30) Foreign Application Priority Data
Apr. 9, 2004   (KR) .................. 10-2004-0024627

(51) Int. Cl.
*F04B 35/04* (2006.01)
(52) U.S. Cl.
USPC ........................................ 417/354

(58) Field of Classification Search
USPC .................................. 417/354; 310/62, 63
See application file for complete search history.

(56) References Cited

U.S. PATENT DOCUMENTS

| | | | |
|---|---|---|---|
| 1,781,155 | A | 11/1930 | Anderson |
| 2,386,883 | A | 10/1945 | Ames |
| 2,936,947 | A | 5/1960 | Staak |
| 2,984,089 | A | 5/1961 | Whitesel |
| 3,127,092 | A | 3/1964 | Shenberger |
| 3,131,468 | A | 5/1964 | Trueman et al. |

(Continued)

FOREIGN PATENT DOCUMENTS

| | | |
|---|---|---|
| CN | 1051467 A | 5/1991 |
| CN | 2288542 Y | 8/1998 |

(Continued)

OTHER PUBLICATIONS

Chinese Office Action issued in Chinese Application No. 2004/0042714.3 dated Jan. 8, 2010.

(Continued)

*Primary Examiner* — Devon Kramer
*Assistant Examiner* — Amene Bayou
(74) *Attorney, Agent, or Firm* — KED & Associates, LLP

(57) ABSTRACT

Fan apparatus for an air conditioner including a fan (50), a shaft (68) coupled to the fan (50), a rotor (60) for transmission of driving force to the shaft (68) for rotating the fan (50), a stator (65) on an inside of the rotor (60) to form a BLDC motor together with the rotor (60), and a fan housing (40) for enclosing the fan (50), thereby reducing noise and enhancing fan (50) efficiency.

41 Claims, 24 Drawing Sheets

(56) References Cited

U.S. PATENT DOCUMENTS

| | | | |
|---|---|---|---|
| 3,175,755 A * | 3/1965 | Rockafield | 417/354 |
| 3,524,328 A | 8/1970 | Schuster | |
| 3,619,088 A | 11/1971 | Bullock | |
| 3,665,727 A | 5/1972 | Mather | |
| 3,680,328 A | 8/1972 | McCarty | |
| 3,775,029 A | 11/1973 | Ranz | |
| 3,830,595 A | 8/1974 | Carpenter | |
| 3,933,416 A | 1/1976 | Donelian | |
| 4,199,302 A | 4/1980 | Goettl | |
| 4,200,257 A | 4/1980 | Litch | |
| 4,373,861 A * | 2/1983 | Papst et al. | 415/218.1 |
| 4,428,719 A * | 1/1984 | Hayashibara et al. | 417/354 |
| 4,455,704 A | 6/1984 | Williams | |
| 4,514,655 A * | 4/1985 | Hosoya | 310/216.102 |
| 4,527,960 A | 7/1985 | DeSisto | |
| 4,659,951 A * | 4/1987 | Angi et al. | 310/62 |
| 4,795,931 A * | 1/1989 | Sturm | 310/90 |
| 4,883,982 A * | 11/1989 | Forbes et al. | 310/62 |
| 5,112,024 A | 5/1992 | Stanko | |
| 5,203,400 A | 4/1993 | Tsunekawa et al. | |
| 5,217,353 A | 6/1993 | DeFilippis | |
| 5,338,992 A | 8/1994 | Tsai | |
| 5,461,880 A | 10/1995 | Bolton et al. | |
| 5,582,026 A | 12/1996 | Barto, Sr. | |
| 5,588,814 A | 12/1996 | DeFilippis et al. | |
| 5,737,944 A * | 4/1998 | Nishimura et al. | 68/23.7 |
| 5,749,116 A | 5/1998 | Wieder et al. | |
| 5,772,176 A | 6/1998 | Keck et al. | |
| 5,798,589 A | 8/1998 | Ohi et al. | |
| 5,810,856 A | 9/1998 | Tveras | |
| 5,818,133 A * | 10/1998 | Kershaw et al. | 310/67 R |
| 5,907,206 A * | 5/1999 | Shiga et al. | 310/156.05 |
| 5,920,139 A * | 7/1999 | Fujiwara et al. | 310/154.11 |
| 5,944,497 A * | 8/1999 | Kershaw et al. | 417/423.8 |
| 5,969,445 A | 10/1999 | Horiuchi et al. | |
| 6,107,708 A * | 8/2000 | Yamaguchi et al. | 310/58 |
| 6,121,700 A | 9/2000 | Yamaguchi et al. | |
| 6,182,460 B1 | 2/2001 | Hernandez et al. | |
| 6,236,126 B1 * | 5/2001 | Yagi et al. | 310/51 |
| 6,297,572 B1 | 10/2001 | Sunaga et al. | |
| 6,320,287 B1 * | 11/2001 | Watson et al. | 310/51 |
| 6,333,576 B1 | 12/2001 | Ishikawa et al. | |
| RE37,625 E | 4/2002 | Wieder et al. | |
| 6,396,177 B1 * | 5/2002 | Shin et al. | 310/63 |
| 6,460,382 B1 * | 10/2002 | Kim et al. | 68/140 |
| 6,474,114 B1 * | 11/2002 | Ito et al. | 68/140 |
| 6,580,193 B2 | 6/2003 | Yoshikawa et al. | |
| 6,588,228 B2 | 7/2003 | Choi | |
| 6,753,629 B2 | 6/2004 | Doi et al. | |
| 6,762,521 B2 | 7/2004 | Peter et al. | |
| 6,830,429 B2 * | 12/2004 | Hirata | 415/206 |
| 6,887,049 B2 | 5/2005 | Chen | |
| 7,227,287 B2 | 6/2007 | Noda et al. | |
| 7,294,942 B2 | 11/2007 | Lee et al. | |
| 2002/0047483 A1 | 4/2002 | Oohashi et al. | |
| 2003/0093007 A1 | 5/2003 | Wood | |
| 2003/0097079 A1 | 5/2003 | Garcia | |
| 2003/0109802 A1 | 6/2003 | Laeseke et al. | |
| 2004/0075356 A1 * | 4/2004 | Horng et al. | 310/154.08 |

FOREIGN PATENT DOCUMENTS

| | | |
|---|---|---|
| CN | 1208822 Y | 2/1999 |
| CN | 2400612 | 10/2000 |
| CN | 1160303 A | 7/2001 |
| CN | 1464928 A | 12/2003 |
| DE | 1 160 573 | 9/1961 |
| DE | 3229458 | 2/1984 |
| DE | 3508635 | 9/1985 |
| DE | 19705318 | 8/1997 |
| DE | 199 11 158 | 10/1999 |
| DE | 19911158 | 10/1999 |
| EP | 0 008 221 | 2/1980 |
| EP | 0 408 221 | 1/1991 |
| EP | 0408221 | 9/1994 |
| EP | 0361775 | 11/1994 |
| EP | 0 800 000 | 10/1997 |
| EP | 1 053 699 | 11/2000 |
| EP | 1 094 145 | 4/2001 |
| EP | 0800000 | 8/2003 |
| EP | 1387053 | 2/2004 |
| EP | 1094145 | 10/2004 |
| GB | 2140085 | 11/1984 |
| JP | 58182465 A * | 10/1983 |
| JP | 4033536 | 2/1992 |
| JP | 11-332203 | 11/1999 |
| JP | 2003-220074 | 8/2003 |
| WO | 03/073010 | 9/2003 |
| WO | WO 03/073010 | 9/2003 |
| WO | WO 2004/023929 | 3/2004 |
| WO | WO 2005/069715 | 8/2005 |

OTHER PUBLICATIONS

Office Action issued in U.S. Appl. No. 11/547,784 dated Apr. 10, 2009.
Chinese Patent Gazette for Appln. No. ZL200480042716.2 dated Jul. 1, 2009.
International Search Report and Written Opinion issued in PCT/KR2004/002084 dated Jul. 10, 2006.
U.S. Office Action issued in U.S. Appl. No. 11/547,784 dated Apr. 2, 2010.
U.S. Office Action issued in U.S. Appl. No. 11/547,858 dated Aug. 25, 2010.
Chinese Office Action dated Nov. 9, 2006 (full Chinese text and full English translation).
Korean Office Action dated May 9, 2008 (full Korean text).
Office Action dated Sep. 2, 2011 for U.S. Appl. No. 11/547,858.
Office Action dated Feb. 13, 2012 for U.S. Appl. No. 11/547,858.
Office Action dated Mar. 3, 2011 in U.S. Appl. No. 11/547,784.
Office Action dated Mar. 3, 2011 in U.S. Appl. No. 11/547,858.
Final Office Action dated Aug. 2, 2011 for U.S. Appl. No. 11/547,784.

* cited by examiner

FAN FOR AIR CONDITIONER

TECHNICAL FIELD

The present invention relates to fan apparatuses for air conditioner, and more particularly, to a fan apparatus having a stable and high efficiency BLDC motor employed therein for enhancing fan, and heat exchange efficiencies.

BACKGROUND ART

In general, in the air conditioners, there are split type air conditioners each having an indoor unit and an outdoor unit respectively installed in a room space and an outdoor separately, and unit type air conditioners each having an indoor unit and an outdoor unit fabricated as one unit, for installation on a window or wall, wherein the split type air conditioners are used widely because, not only of sizes of the indoor units and the outdoor units that become the larger as cooling/heating capacities of the air conditioners become the larger, but also of heavy vibration of the outdoor units coming from compressors therein.

The split type air conditioner is provided with the indoor unit in a room to make heat exchange between low temperature, and low pressure gaseous refrigerant and air for supplying warm or cold air into a space to be air conditioned, the outdoor unit in an outdoor to compress, condense, and expand the refrigerant for making the heat exchange at the indoor unit, and refrigerant pipelines between the indoor unit and the outdoor unit.

The indoor unit is provided with an indoor case having an inlet and an outlet for drawing/discharging room air, an evaporator in the indoor case for making heat exchange between the low temperature, and low pressure gaseous refrigerant passing therethrough and air, and an indoor fan and a motor on one side of the evaporator for making room air to pass the evaporator so that cold air is discharged to the room again.

The outdoor unit is provided with an outdoor case having inlets and an outlet for drawing/discharging outdoor air, a compressor in the outdoor case for compressing high temperature, high pressure gaseous refrigerant passed through the evaporator, a condenser for making heat exchange between the refrigerant passed through the compressor with outdoor air to condense the refrigerant into medium temperature, high pressure liquid refrigerant, expansion means, such as a capillary tube, or an electronic expansion valve for decompressing the refrigerant passed through the condenser into low temperature, low pressure gaseous refrigerant, and an axial outdoor fan and a motor on one side of the condenser for making the outdoor air to pass the condenser, wherein the motor is a single phase, or three phase induction motor having a stator mounted on an inside of a housing, and a shaft and a rotor in a central part of the stator for rotating the rotor by a rotating magnetic field formed as AC is applied to the stator.

In general, the outdoor case has the inlets in three sides for enhancing a fan efficiency, and the outlet in a top surface, for drawing air through the three sides, making the air to heat exchange, and discharging the air to the top surface.

The compressor, the condenser, the expansion means, and the evaporator are connected with the refrigerant pipelines to each other, for circulation of the refrigerant therethrough while the refrigerant is compressed, condensed, expanded, and evaporated.

In the meantime, the foregoing outdoor unit of the related art air conditioner has a limited installation place due to high concentration of a city, with consequential strengthening of environmental control, and becomes an object of complaints due to noise and heat emission. Particularly, for an apartment in a large group of apartment houses, installation of the air conditioner is regulated such that the outdoor unit is installed within a veranda due to outside appearance and noise.

Consequently, air conditioner outdoor units of a front suction/discharge type are employed in the large group of apartment houses recently, in which air is drawn only through a front, made to heat exchange, and discharged to the front, again.

However, the air conditioner outdoor units of a front suction/discharge type has low fan, and heat exchange efficiencies due to a smaller air suction area than the air conditioner outdoor unit of three side suction/discharge type.

Moreover, the general single phase or three phase induction motor used for the fan of the air conditioner outdoor unit of the front suction/discharge type has problems in that an overall efficiency is low below 40~50%, and rotation speed variation is limited to a small range due to a narrow stable torque range. If a rotation speed is outside of the stable torque range, noise becomes heavier and efficiency becomes poorer.

DISCLOSURE OF INVENTION

An object of the present invention is to provide a fan apparatus for an air conditioner which can reduce noise, and enhance a fan efficiency, and a heat exchange efficiency by employing a BLDC motor that can make stable drive of the fan, and increase an air flow rate.

The object of the present invention can be achieved by providing a fan apparatus for an air conditioner including a fan, a shaft coupled to the fan, a rotor for transmission of driving force to the shaft for rotating the fan, a stator on an inside of the rotor to form a BLDC motor together with the rotor, and a fan housing for enclosing the fan, thereby reducing noise and enhancing fan efficiency.

In another aspect of the present invention, a fan apparatus for an air conditioner includes a sirocco fan which is a centrifugal fan, a shaft coupled to the sirocco fan, a rotor for transmission of driving force to the shaft for rotating the sirocco fan, the rotor having a rotor frame of a steel plate and magnets, a stator on an inside of the rotor to form a BLDC motor together with the rotor, and a fan housing for enclosing the sirocco fan.

In another aspect of the present invention, a fan apparatus for an air conditioner includes a sirocco fan which is a centrifugal fan, a shaft coupled to the sirocco fan for transmission of driving force from the motor to the sirocco fan, a rotor for transmission of driving force to the shaft for rotating the sirocco fan, the rotor having a rotor frame of a steel plate and magnets, a stator on an inside of the rotor to form a BLDC motor together with the rotor, bearings for supporting the shaft, a rotor bushing of an insulating material between the rotor and the shaft for transmission of rotation force from the rotor to the sirocco fan, and a fan housing mounted to enclose the sirocco fan, the fan housing having an air inlet and an air outlet, and a stator securely mounted on an opposite side of the air inlet.

BRIEF DESCRIPTION OF DRAWINGS

The accompanying drawings, which are included to provide a further understanding of the invention, illustrate embodiment(s) of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. In describing the embodiments, identical parts will be given to the same names, and additional and repetitive description of which will be omitted.

Figure 1:
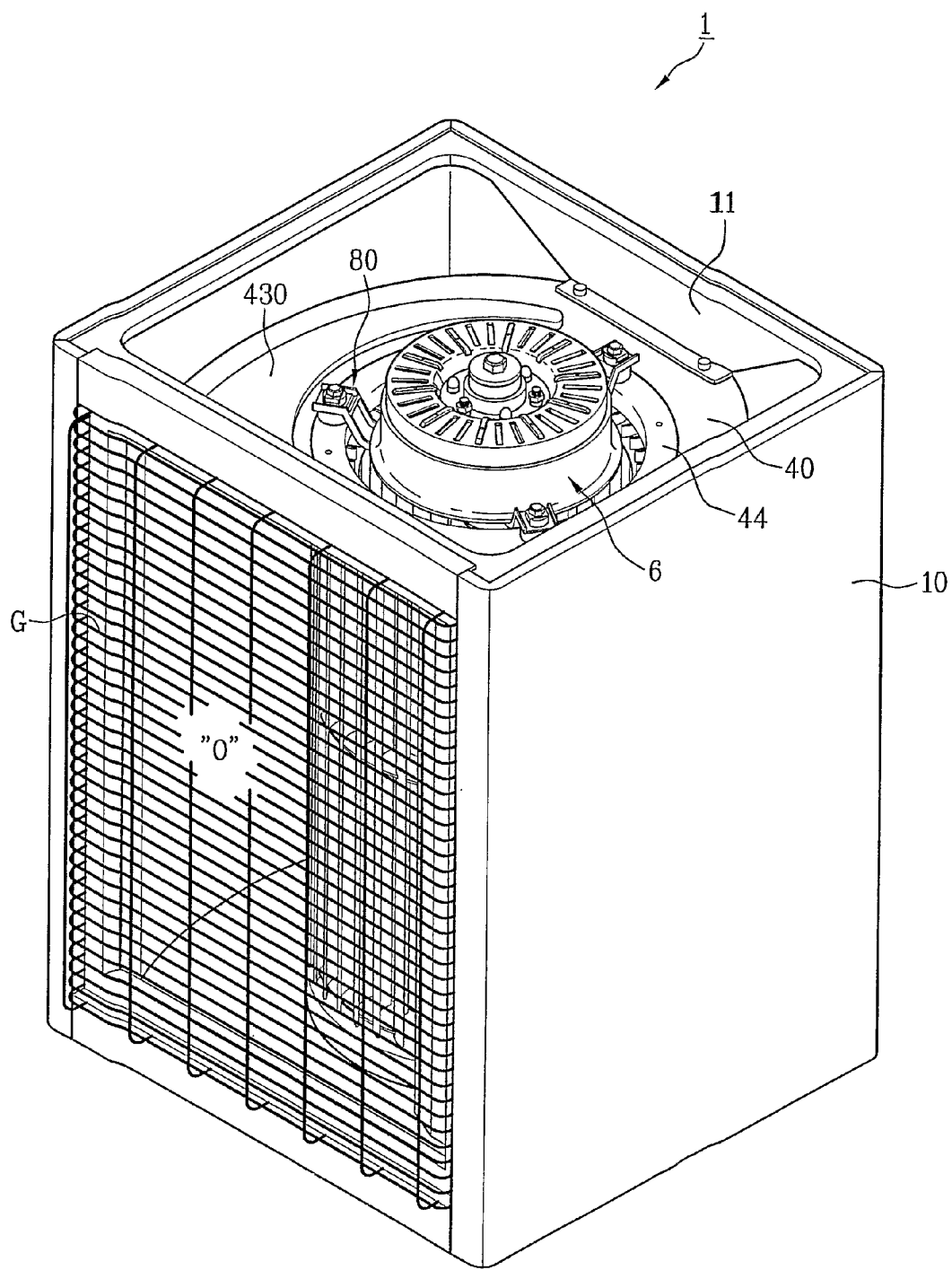
FIG. 1 illustrates a perspective view of a fan apparatus for an air conditioner in accordance with a preferred embodiment of the present invention.
Figure 2:
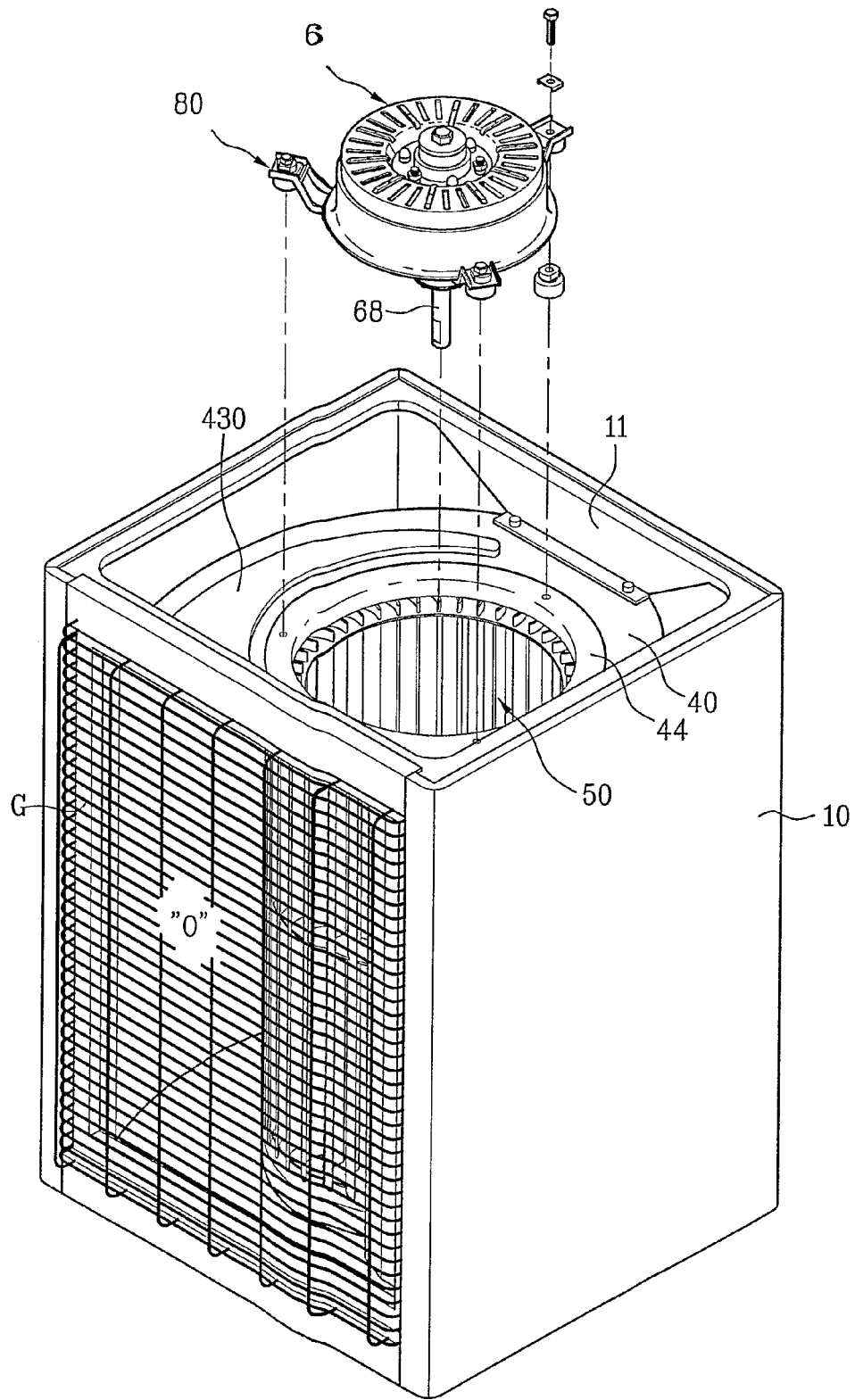
FIG. 2 illustrates a reference perspective view of an assembly of a BLDC motor and a supporter in a state the assembly is separated from a fan housing and a fan.
Figure 3A:
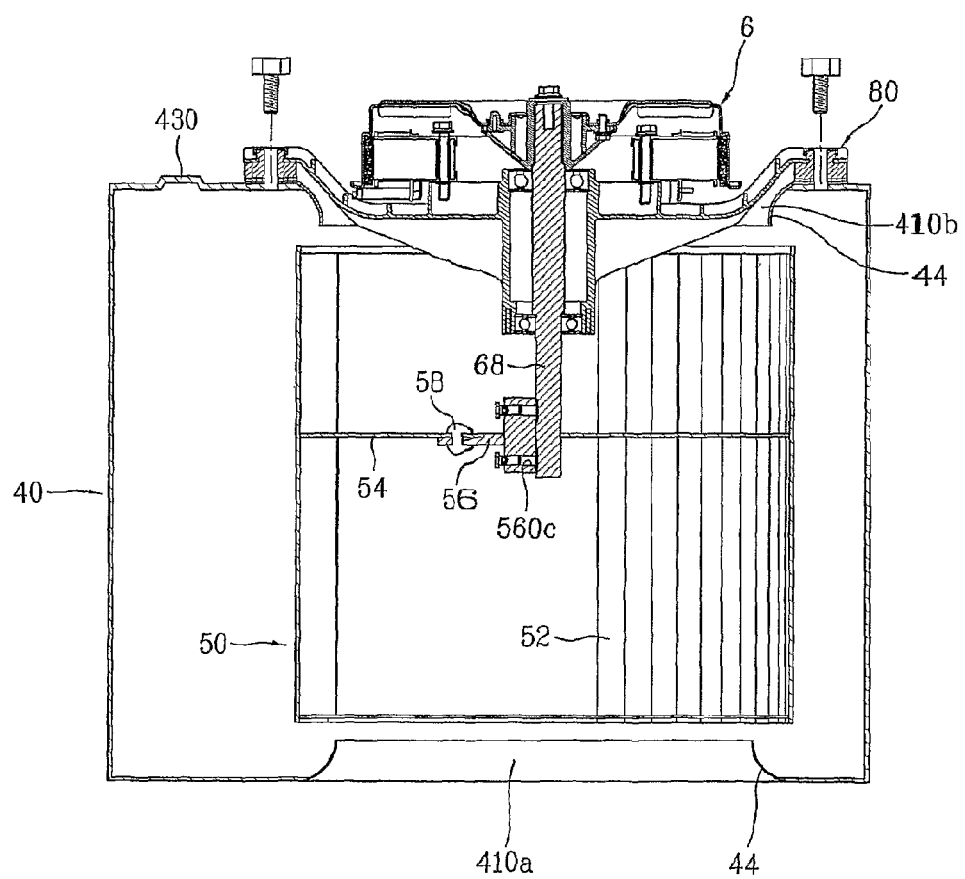
FIG. 3A illustrates a section of a fan apparatus in accordance with a preferred embodiment of the present invention.
Figure 3B:
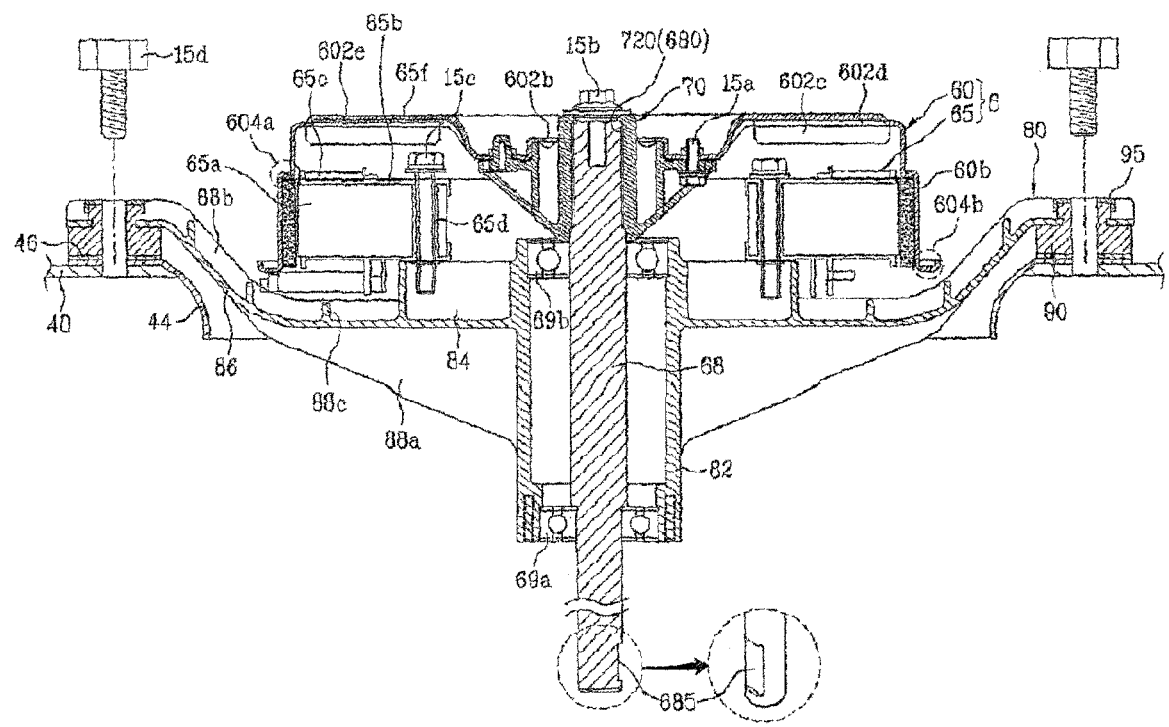
FIG. 3B illustrates a partial enlarged view of the motor and the supporter in FIG. 3A.

FIG. 1 illustrates a perspective view of a fan apparatus for an air conditioner in accordance with a preferred embodiment of the present invention, FIG. 2 illustrates a reference perspective view of an assembly of a BLDC motor and a supporter in a state the assembly is separated from a fan housing and a fan, FIG. 3A illustrates a section of a fan apparatus in accordance with a preferred embodiment of the present invention, and FIG. 3B illustrates a partial enlarged view of the motor and the supporter in FIG. 3A.

Figure 6A:
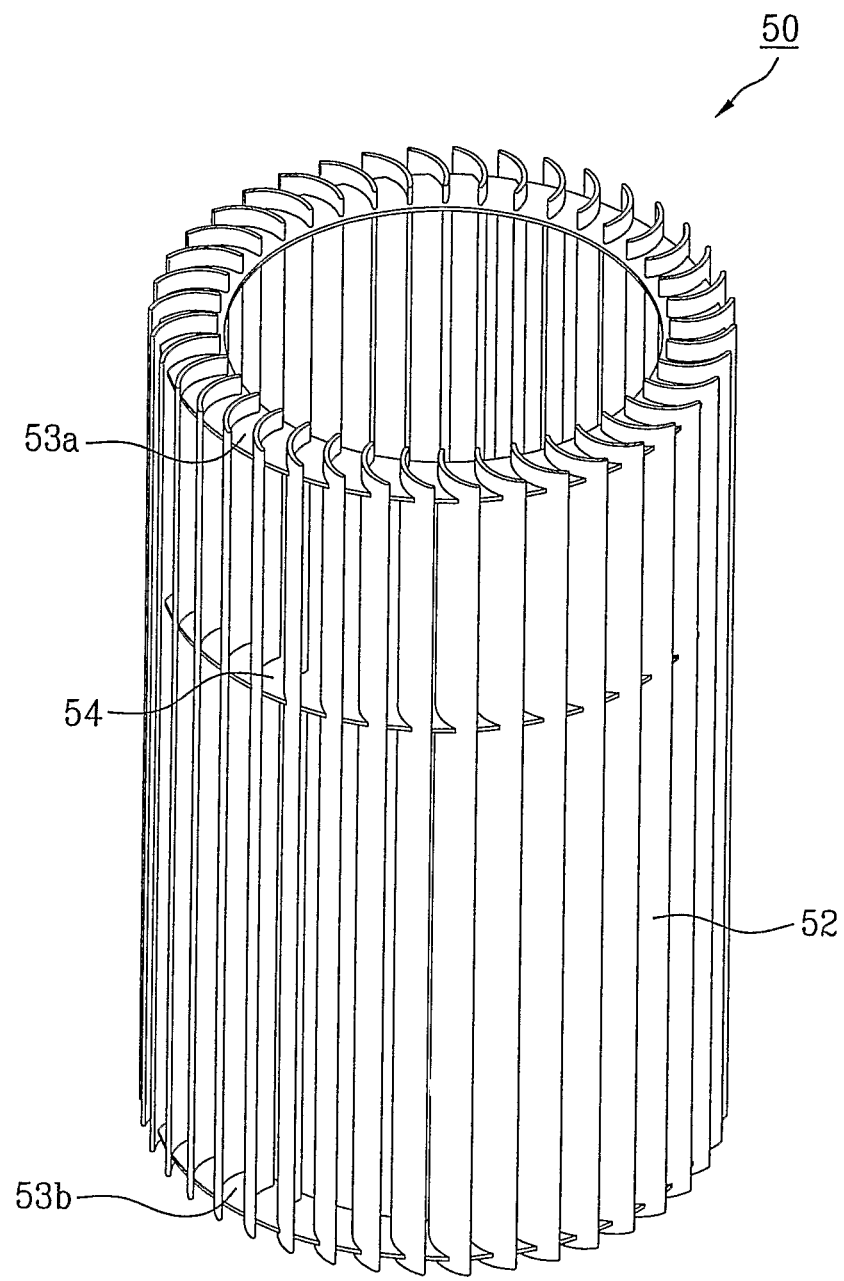
FIG. 6A illustrates a perspective view of the sirocco fan in FIG. 3A.
Figure 6B:
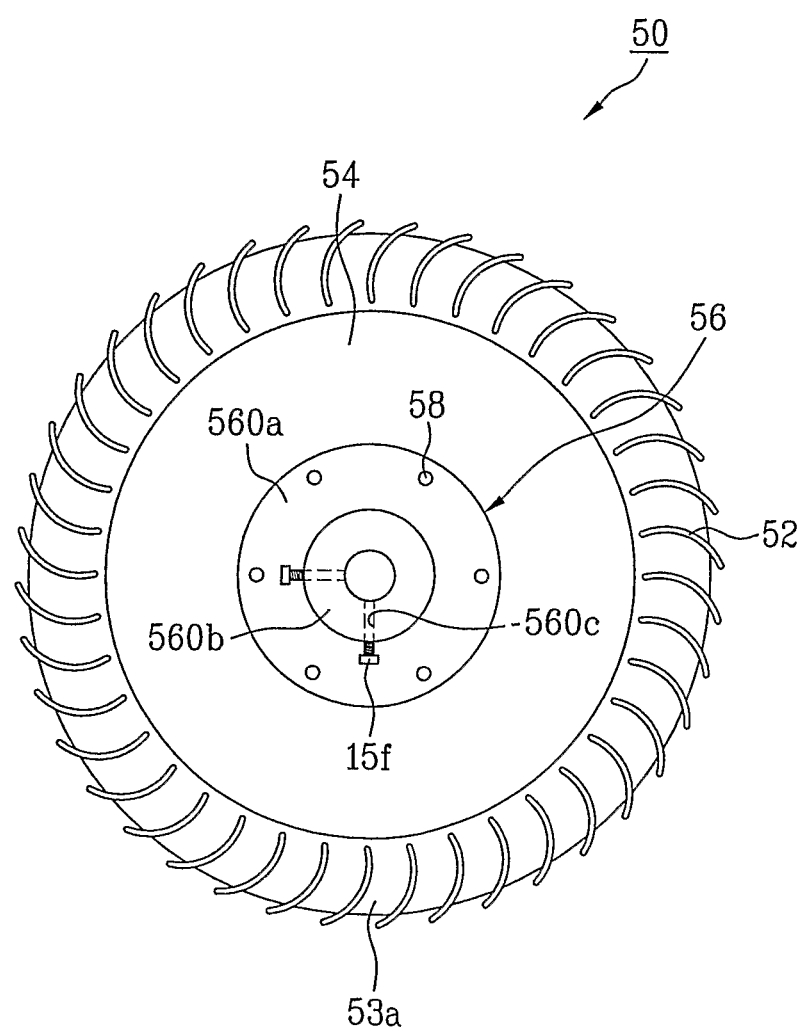
FIG. 6B illustrates a plan view of FIG. 6A.

Though the fan in FIG. 3A shows a half section, with a bushing therein shown only a half accordingly, the bushing has a disc shape with symmetric left and right sides actually as shown in FIG. 6B.

Figure 4A:
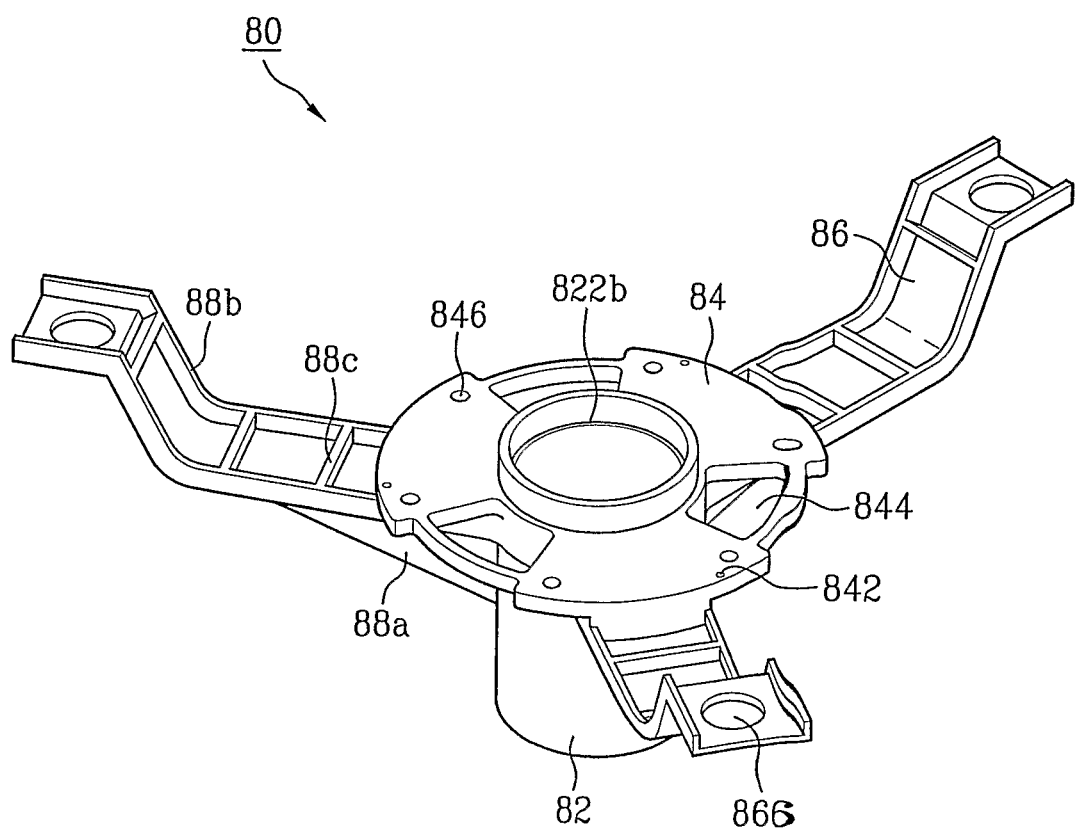
FIG. 4A illustrates a perspective view of the supporter in FIG. 3A.
Figure 4B:
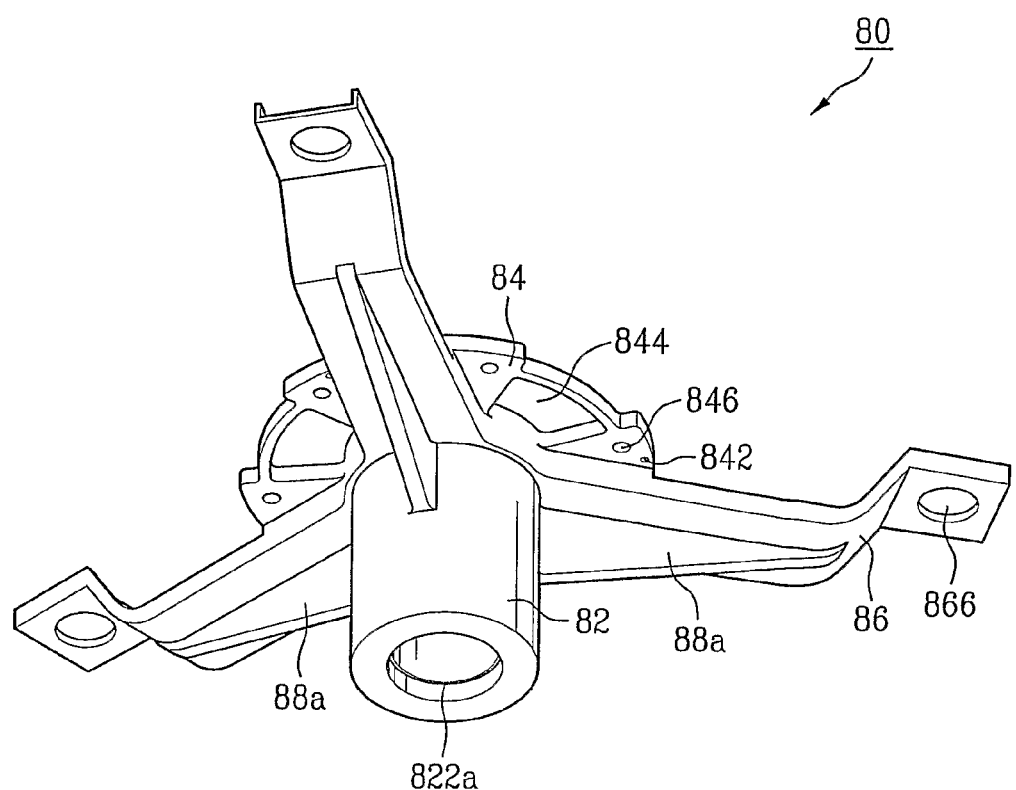
FIG. 4B illustrates a bottom perspective view of FIG. 4A.
Figure 5:
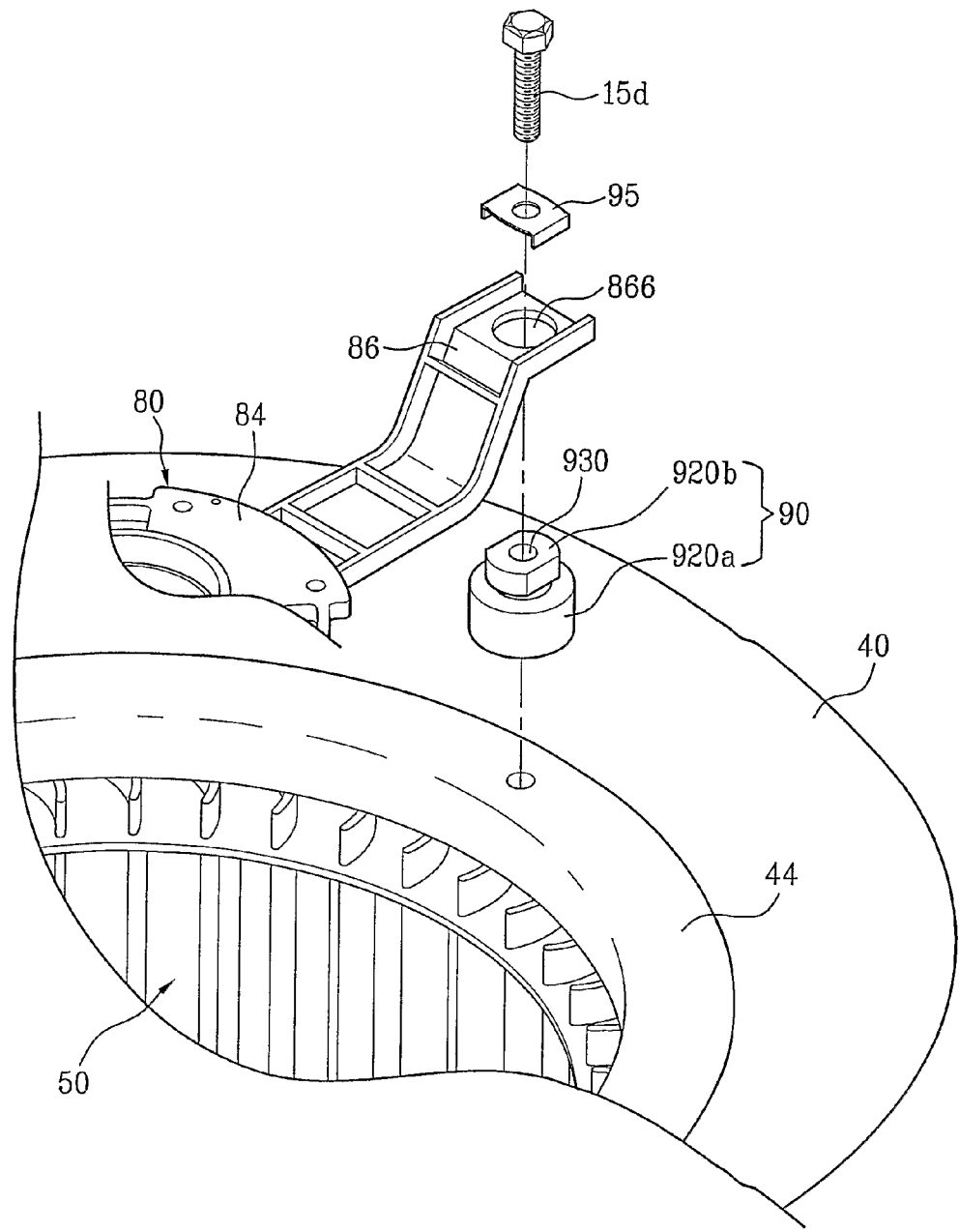
FIG. 5 illustrates a partial perspective view showing a state in which a vibration damping member is mounted on a supporter securing portion of a supporter.

FIG. 4A illustrates a perspective view of the supporter in FIG. 3A, FIG. 4B illustrates a bottom perspective view of FIG. 4A, and FIG. 5 illustrates a partial perspective view showing a state in which a vibration damping member is mounted on a supporter securing portion of a supporter.

Figure 7A:
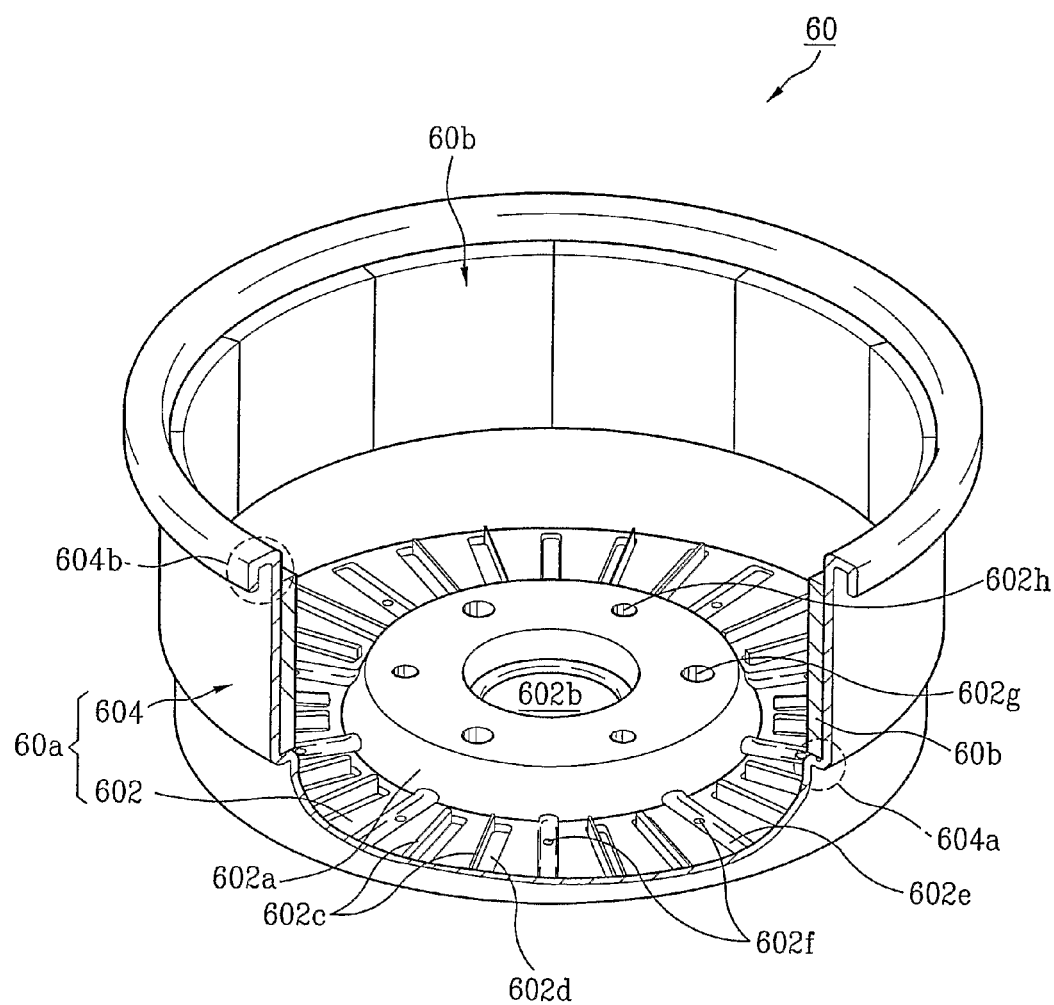
FIG. 7A illustrates a perspective view of the rotor in FIG. 3A, with a partial cut away view.
Figure 7B:
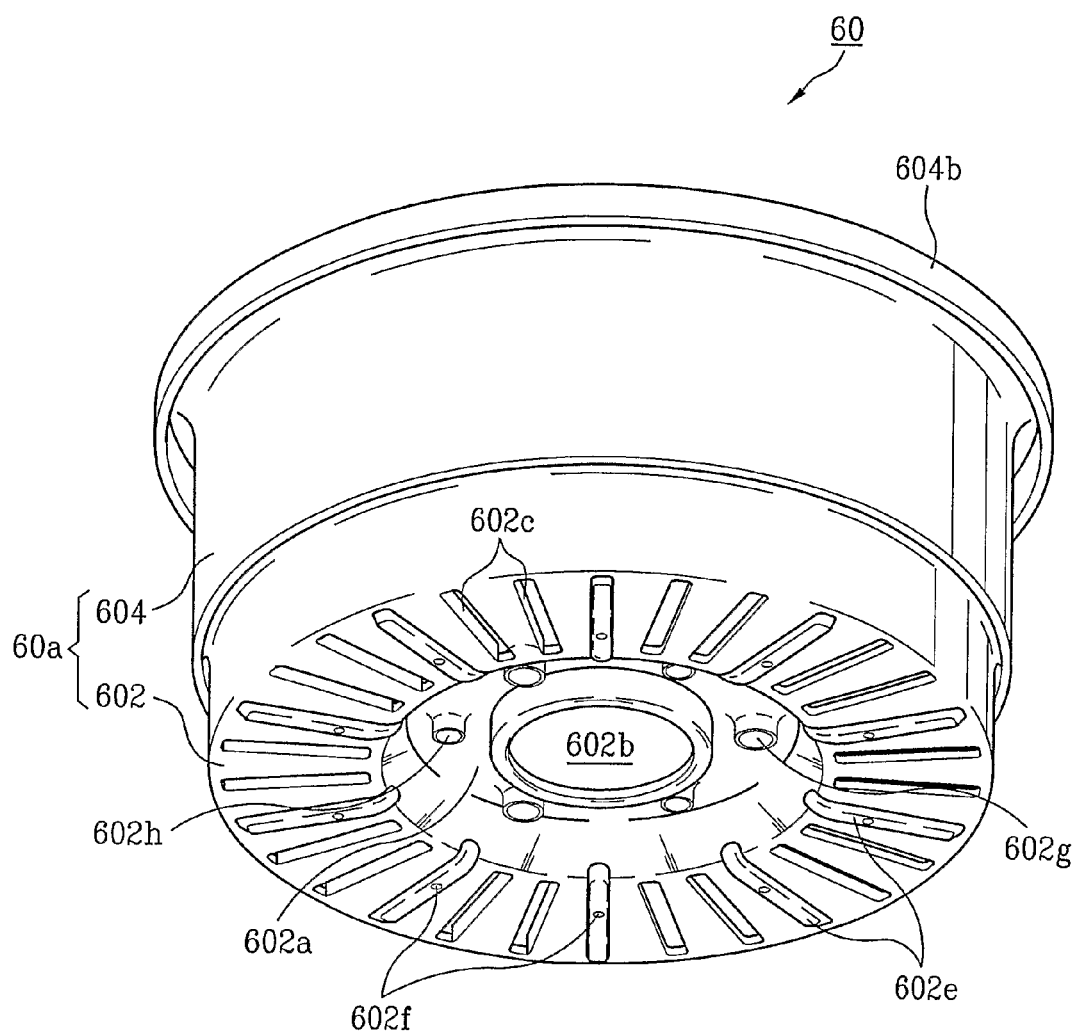
FIG. 7B illustrates a bottom perspective view of FIG. 7A.

FIG. 6A illustrates a perspective view of the sirocco fan in FIG. 3A, FIG. 6B illustrates a plan view of FIG. 6A, FIG. 7A illustrates a perspective view of the rotor in FIG. 3A, with a partial cut away view, and FIG. 7B illustrates a bottom perspective view of FIG. 7A.

Figure 8A:
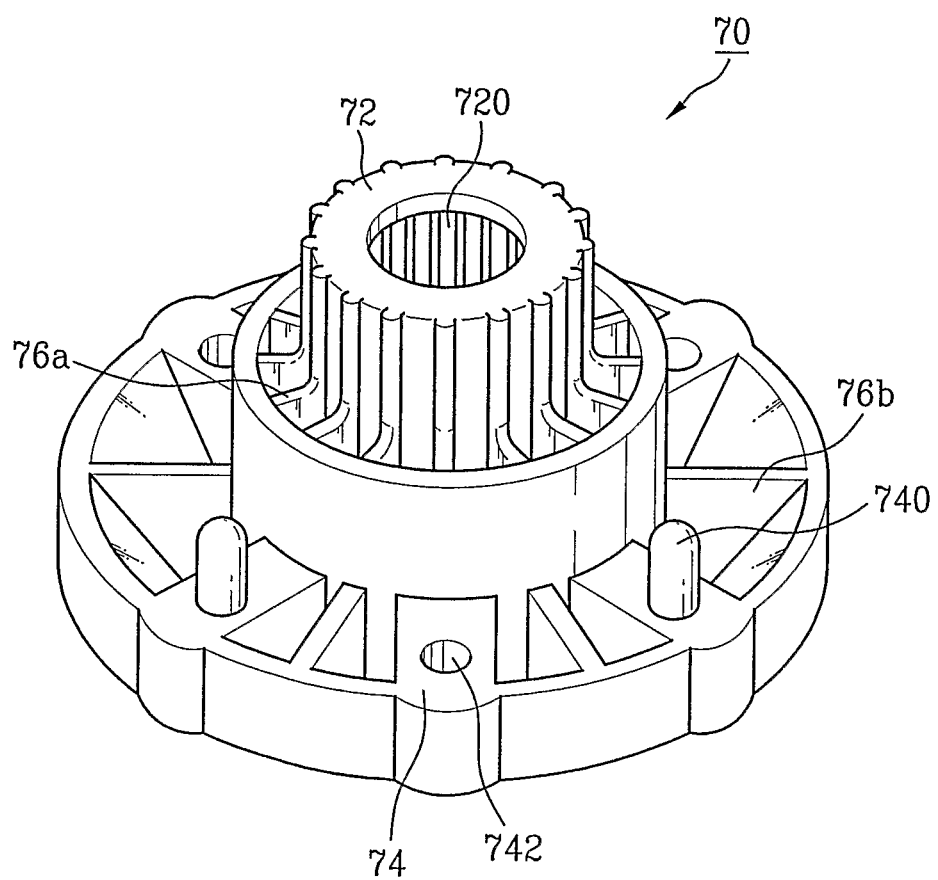
FIG. 8A illustrates a perspective view of the rotor bushing in FIG. 3A.
Figure 8B:
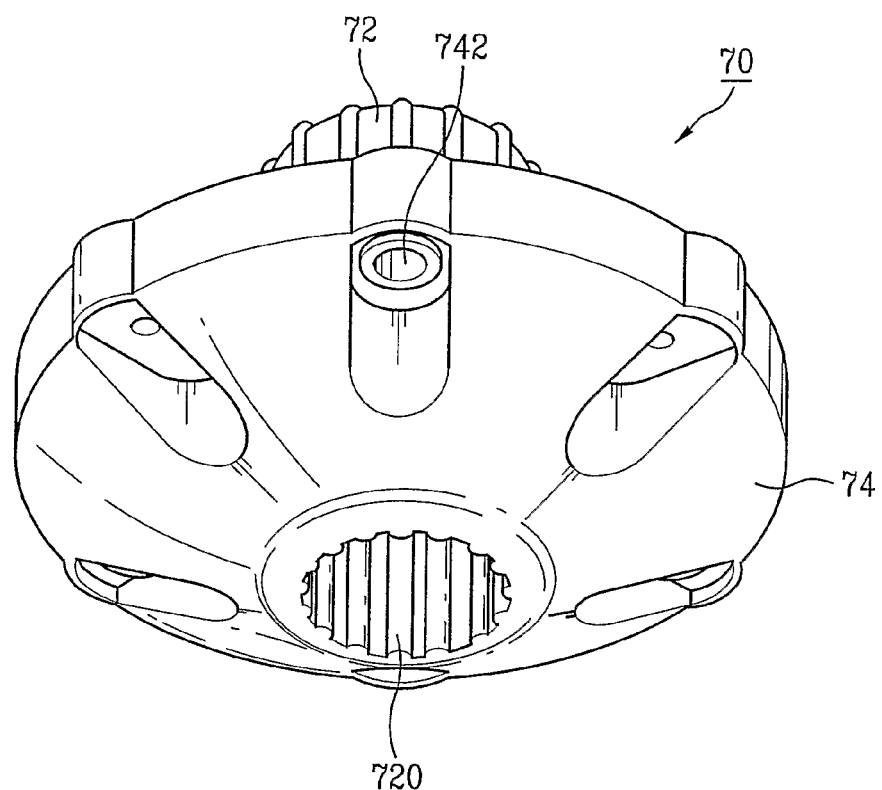
FIG. 8B illustrates a bottom perspective view of FIG. 8A.
Figure 9:
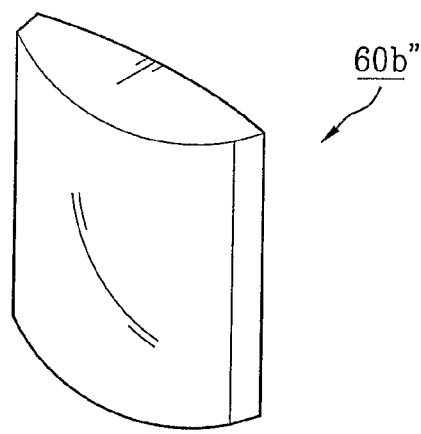
FIG. 9 illustrates a perspective view of a magnet applied to a rotor in accordance with another embodiment of the present invention.

FIG. 8A illustrates a perspective view of the rotor bushing in FIG. 3A, FIG. 8B illustrates a bottom perspective view of FIG. 8A, and FIG. 9 illustrates a perspective view of a 'C' shaped magnet.

Figure 10:
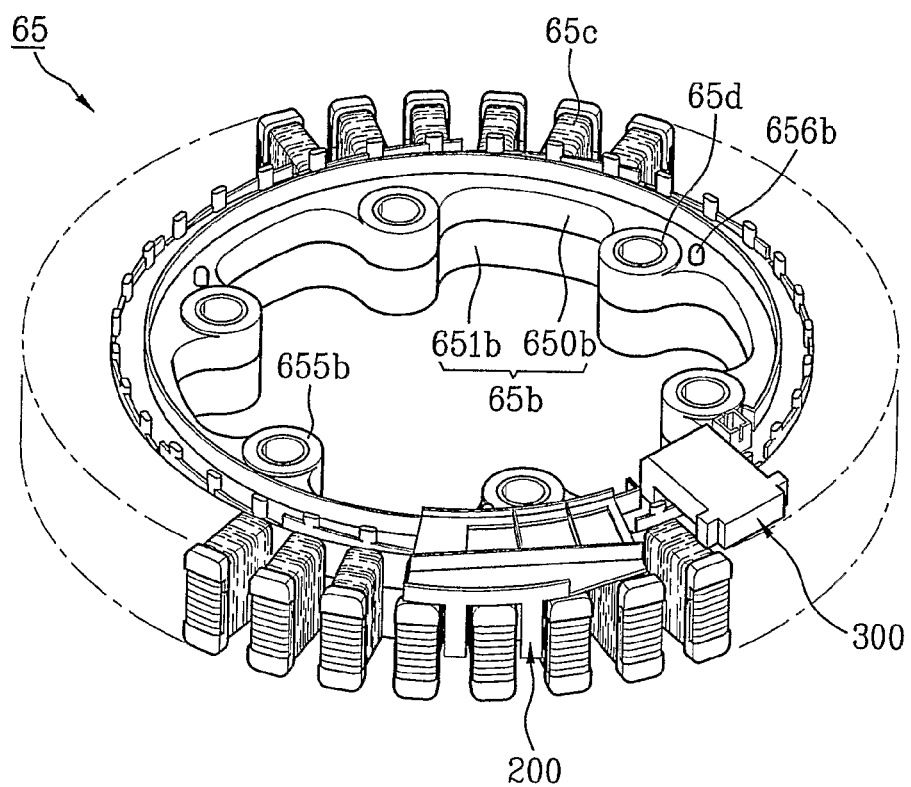
FIG. 10 illustrates a perspective view of the stator in FIG. 3A.
Figure 11:
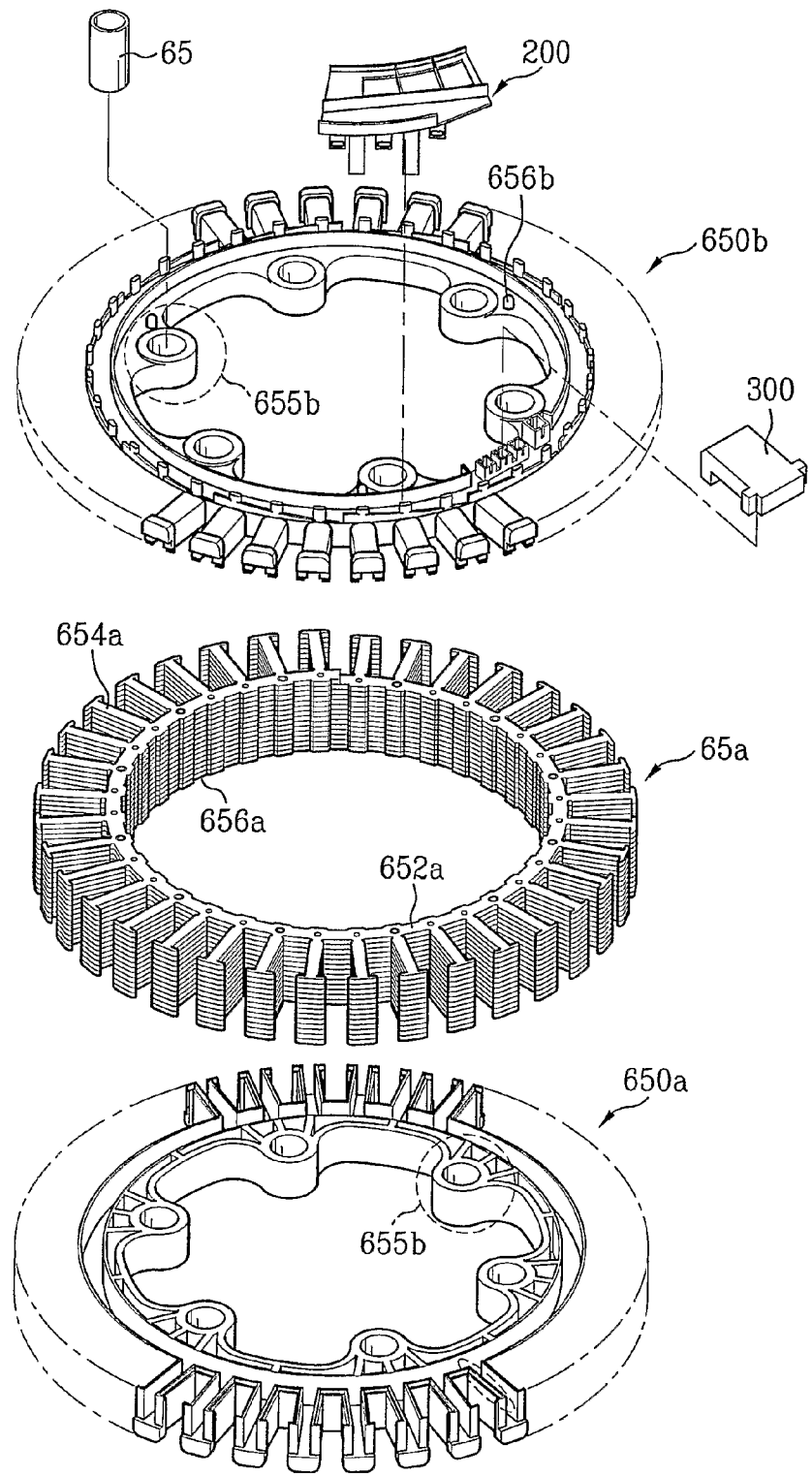
FIG. 11 illustrates a disassembled perspective view of FIG. 10.
Figure 12:
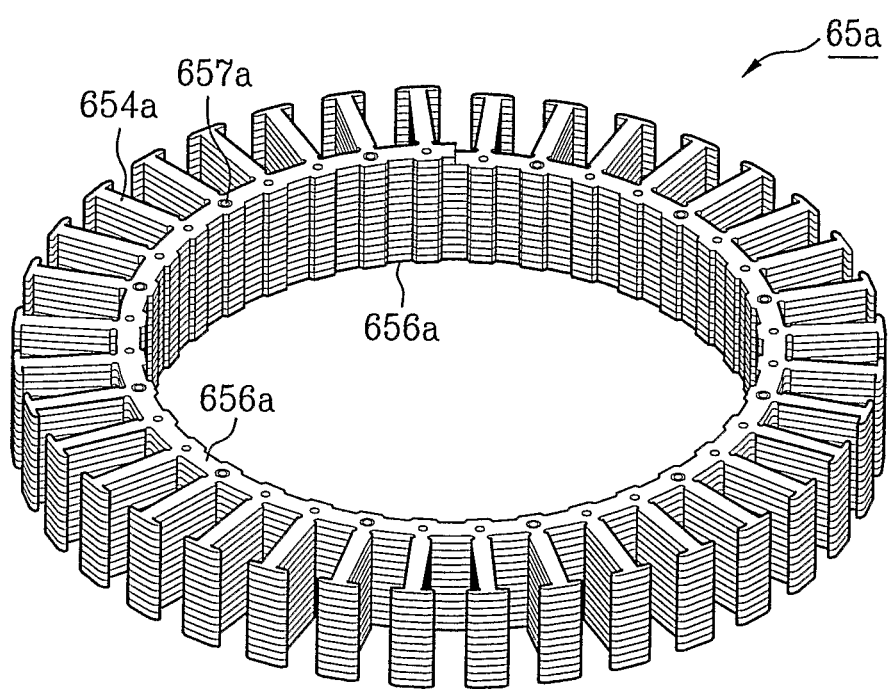
FIG. 12 illustrates a perspective view of a helical core, as an enlarged view of the core in FIG. 11.

FIG. 10 illustrates a perspective view of the stator in FIG. 3A, FIG. 11 illustrates a disassembled perspective view of FIG. 10, and FIG. 12 illustrates a perspective view of a helical core, as an enlarged view of the core in FIG. 11.

The fan apparatus 1 of the present invention includes an outside case 10, a fan housing 40 secured to an inside of the outside case 10 having air inlets 410a and 410b in top and bottom, and an air outlet in a front, a sirocco fan 50, a centrifugal fan, mounted on an inside of the fan housing 40, a shaft 68 fixed to the sirocco fan 50, for transmission of power from a motor to the sirocco fan 50, bearings 69a and 69b for supporting the shaft 68, a supporter 80 secured to an upper surface of the fan housing 40, for supporting the bearings 69a and 69b and a stator 65, a rotor bushing 70 of an insulating material secured to an opposite end portion of a fan connecting portion of the shaft 68, a rotor 60 secured to the rotor bushing 70 for transmission of power to the shaft 68 through the rotor bushing 70, and the stator 65 securely mounted on the supporter 80 inside of the rotor 60 so as to maintain concentricity to the rotor 60 to construe a BLDC motor 6 together with the rotor 60.

Sides of the outside case 10 facing the air outlet and the air inlets 410a, and 410b of the fan housing 40 are opened, and a grill G is mounted on an opened side facing the air outlet of the fan housing 40.

In the meantime, the fan housing 40 includes an air inlet 410a in a bottom, and an air inlet 410b in a top spaced a distance from the bottom, which can also be used as an opening for mounting a motor, and an air outlet in one of sidewalls which connect the bottom and the top and surround the sirocco fan 50. The fan housing 40 may be formed of metal sheet or synthetic resin.

In the meantime, the sirocco fan 50 is mounted in the fan housing 40 such that an axis of the fan housing 40 is eccentric from an axis of the fan housing 40. That is, the axis of the fan housing 40 is not coincident with the axis of the sirocco fan 50, but spaced from the axis of the sirocco fan 50. Therefore, as can be noted in FIG. 3A, left and right side spaces between the fan housing 40 and the sirocco fan 50 differ.

Between the outside case 10, and the fan housing 40, there is a supporting bracket 11 for supporting the fan housing on the outside case 10. Though it is preferable that the supporting bracket 11 is extended from the outside case 10 as one unit and fastened to the top of the fan housing 40, the supporting bracket 11 may be placed between the outside case 10 and the fan housing 40 as a separate member.

Referring to FIG. 1, the fan housing 40 has a reinforcing forming portion 430 substantially along a circumference direction with a width varied with a top surface of the fan housing 40 which becomes the greater as it comes to a wider portion (a front side of the outside case).

In the meantime, there are shrouds 44 respectively mounted on the air inlet 410*a* in the bottom of the fan housing 40 and the air inlet 410*b* in the top of the fan housing 40 that also serves as a motor mounting opening, for guiding air flow introduced into the fan.

Though a case of the shroud 44 is shown as an example, in which each of the shrouds 44 includes, as separate members, a fastening surface 440*a* for fastening to a periphery of the top or bottom air inlet 410*a* or 410*b* of the fan housing 40, and a guide 440*b* of a predetermined curvature for guiding an air flow, the shrouds 44 may be formed as one unit with the fan housing 40. In this case, the shroud 44 has a thickness that becomes the thinner compared to other portion as it goes toward an end the farther.

In the meantime, referring to FIGS. 3A, 3B, and 4, the supporter 80, preferably of a cast metal, such as aluminum, includes a bearing housing portion 82 having shaft 68 supporting bearings 69*a* and 69*b*, such as bell bearings, mounted therein, supporter securing portions 86 each extended outwardly in a radial direction from the bearing housing portion 82 for securing the supporter 80 to the top of the fan housing 40, and a stator 65 securing portion formed so as to join the supporter securing portions 86 to form a surface for securing the stator 65 thereto.

That is, the supporter securing portion 86 of the supporter 80 has a tripod shape.

Moreover, it is required that the supporter 80 is bent toward a top portion of the fan housing 40 such that ends of the supporter securing portions 86 are positioned above a stator fastening surface, for positioning at least the stator fastening surface of the supporter inside of the fan housing 40 when the supporter is mounted on the fan housing 40.

The supporter 80 has reinforcing ribs 88*a* for reinforcing a strength of the supporter securing portion 86, preferably connected also to the stator securing portion 84, and an outside circumferential surface of the bearing housing portion 82.

The supporter 80 and the stator 65 have positioning projections and positioning holes 842 respectively formed opposite to each other for aligning concentricity of the supporter 80 and the stator 65 in fastening the stator 65 to the supporter 80. In more detail, the stator securing portion 84 of the supporter 80 have the positioning holes 842 for fixing a fastening position of the stator 65, and the stator 65 facing the stator securing portion 84 has the positioning projections (see 656*b* in FIG. 10). Of course, the positioning projections may be formed on the supporter, while the positioning holes may be formed on the insulator of the stator.

In the meantime, the stator securing portions 84 of the supporter 80 have pass through holes 844 for enhancing motor cooling capability.

Of steps 822*a* and 822*b* on an inside circumferential surface of the bearing housing portion 82, the step 822*a* at a lower portion has a "⏋" shape for supporting an upper end of the lower bearing 69*a* of the bearings mounted on outside circumferential surfaces of the shaft 68, and of steps 822*a* and 822*b* on an inside circumferential surface of the bearing housing portion 82, the step 822*b* at an upper portion has a "⎾" shape for supporting a lower end of the upper bearing 69*b* of the bearings mounted on outside circumferential surfaces of the shaft 68.

The shaft 68 inside of the bearing housing portion 82 for transmission of power from the rotor 60 to the fan housing 40 may have positioning steps at an upper portion and a lower portion of an outside circumferential surface for positioning the lower bearing and the upper bearing at the shaft 68.

Referring to FIGS. 3A, 3B, and 5, it is preferable that vibration damping pads 46 are provided at contact surfaces of the fan housing 40 and the shrouds 44.

In more detail, the vibration damping pads 46 are mounted between the fastening surfaces 440*a* of the shrouds 44 and peripheral surfaces of the air inlets 410*a* and 410*b* of the fan housing 40 in contact thereto, for cutting off transmission of vibration from the motor to the fan housing 40.

A damping member 90 is provided between the supporter securing portion 86 of the supporter 80 and the fan housing 40.

Referring to FIG. 5, the vibration damping member 90 includes a body portion 920*a* in contact with the fan housing 40, and a head portion 920*b* to be forcibly inserted through a vibration damping member securing hole 866 in the supporter securing portion 86 and held at the supporter securing portion 86. There is a pass through hole 930 through the body portion 920*a* and the head portion 920*b*.

It is preferable that a cover bracket 95 of metal, such as steel plate, is placed on the head portion 920*b* of the vibration damping member 90 to the vibration damping member 90 caused by fastening force on a fastening member, such as a bolt 15*d*, passed through the vibration damping member 90 at the time the supporter 80 is secured to the fan housing 40.

The cover bracket 95 is a horse shoe shaped steel piece to cover the head portion 920*b*.

That is, the vibration damping member 90 is secured as a neck portion between the body portion 920*a* and the head portion 920*b* is caught at an edge of the vibration damping member securing hole 866 when the head portion 920*b* is forcibly pushed through the vibration damping member securing hole 866 in the supporter securing portion 86. In this state, after the cover bracket 95 is placed on the head portion 920*b*, the bolt 15*d* is passed through the pass through hole 930 in the cover bracket 95 and the vibration damping member 90, and fastened to the fan housing 40, to secure the supporter 80 to the fan housing 40.

Referring to FIGS. 3A, 3B, 6A, and 6B, the sirocco fan 50 includes a main plate 54 for connecting blades 52 arranged on an inside of the fan along a circumferential direction thereof, having a bushing 56 at a central portion thereof for coupling the shaft 68 to the sirocco fan 50.

At a lower end and an upper end of the blades 52, there are holding plates 53*a* and 53*b* for holding the blades together for preventing the blades from shaking at fast rotation of the fan and noise caused thereby.

The bushing 56 includes a base portion 560*a* of a disc shape in close contact with a main plate 54 surface, and a hub portion 560*b* projected from a central portion of the base portion 560*a* in an axis direction, and having a shaft 68 inserting hole at the central portion.

The bushing 56 has two pieces, which are riveted with rivets 58 or fastened with screws in a state the two pieces are closely fitted to opposite sides of the main plate 54.

The main plate 54 is mounted at a position nearer to the motor with reference to the middle of a length of the sirocco fan 50. This is because, of the air inlets 410*a* and 410*b* of the fan housing 40, an air flow rate through the air inlet 410a opposite to a side the motor is mounted thereon is higher.

It is preferable that the main plate 54 is positioned such that, in a case an entire length of the sirocco fan 50 between two fan ends is divided into two lengths with reference to the main plate 54, a ratio of a short length from the main plate 54 to a fan end to a long length from the main plate 54 to the other fan end falls within a range of 1:1.3~1:3.

The hub portion 560b of the bushing 56 has at least one bolt fastening hole 560c in an outside circumference, and the shaft 68 has a flat section 685 at an outside circumference of an end portion for applying a compression force of the bolt 15f passed through, and fastened to the bolt fastening hole 560c in assembly.

In assembly, as the compression force of the bolt is applied to the flat section 685, the sirocco fan 50 is secured to the shaft 68 rigidly enough to rotate as one unit.

Referring to FIGS. 3A, and 3B, though it can be noted that the rotor bushing 70 is joined with the shaft 68 and the rotor frame 60a in a state the rotor bushing 70 is positioned under the rotor frame 60a, the rotor bushing 70 may be joined with the shaft 68 and the rotor frame 60a in a state the rotor bushing 70 is positioned over the rotor frame 60a.

In the meantime, referring to FIGS. 8A and 8B, the rotor bushing 70 includes a tooth portion 72 having a central portion for inserting and engagement of the shaft 68 therewith, and a joining portion 74 extended from a circumference of the tooth portion 72 in a radial direction for joining with the rotor frame 60a.

The joining portion 74 of the rotor bushing 70 has a plurality of positioning projections 740 formed as one unit therewith for inserting into the positioning holes 602g in the rotor frame 60a in assembly.

The joining portion 74 of the rotor bushing 70 also has fastening holes 742 for fastening to the rotor frame 60a with bolts.

The tooth portion 72 and the joining portion 74 of the rotor bushing 70 have reinforcing ribs 76a and 76b respectively.

The shaft 68 has serration 680 on an outside circumferential surface of the top end portion, and the rotor bushing 70 has serration 720 on an inside circumferential surface of a central hole in the tooth portion 72, for engagement with the serration 680 of the shaft 68.

That is, the rotor bushing 70 is fastened to the rotor frame 60a with fastening members such as bolts or the like passed through the fastening holes 742 in the joining portion 74, and the shaft 68, inserted through the central portion of the tooth portion 68 and connected to the rotor bushing 70 with serration engagement, is fastened to the rotor bushing 70 with the bolt 15b inserted into the fastening hole at an end portion thereof.

In the meantime, the rotor bushing 70 is formed of synthetic resin having a vibration mode different from the rotor frame 60a of steel plate.

Referring to FIGS. 3A, 3B, 7A, and 7B, the rotor 60 includes a rotor frame 60a, and magnets 60b mounted on an inside thereof, wherein the rotor frame 60a is preferably formed of steel plate taking productivity and formability into account.

However, material of the rotor frame is not limited to above, but the rotor frame 60a may be formed by injection molding, or a steel plate and an injection molding that covers an outside of the steel plate.

The rotor frame 60a includes a bottom portion 602 of a substantially disc shape, and a sidewall portion 604 extended in a substantially vertical direction from a circumference of the bottom portion 602, wherein the sidewall portion 604 has a bent portion 604a formed along a circumferential direction having a seating surface for supporting magnets 60b mounted on an inside surface thereof, and the bottom portion 602 has a hub portion 602a having a pass through hole 602b at a central portion for pass of fastening members, such as bolts 15b, for fastening the rotor 60 to the shaft 68.

The bottom portion 602 of the rotor frame 60a also has fastening holes 602h in correspondence to the fastening holes 742 in the joining portion 74 of the rotor bushing 70.

In the meantime, the bottom portion 602 of a substantially disc shape, and the sidewall portion 604 extended in a substantially vertical direction from a circumference of the bottom portion 602 of the rotor frame 60a are formed as one unit by pressing, if the rotor frame 60a is formed of a steel plate.

In this instance, the sidewall portion 604 has an opened end edge bent in a radial direction outwardly for the first time, and bent again downwardly toward the bottom portion 602 for the second time.

The bent portion 604b at the opened end edge of the sidewall portion 604 of the rotor frame 60a enhances rigidity of the sidewall portion 604, and prevents distortion of the rotor occurred at a time of fast rotation, and noise caused thereby in advance.

The rotor frame 60a has a plurality of cooling fins 602c around the hub portion 602a in a radial direction for blowing air toward the stator 65 to cool heat generated at the stator 65 when the rotor 60 rotates. The cooling fin 602c has a predetermined length in a radial direction.

In the meantime, the cooling fins 602c are formed by lancing, such that the cooling fins 602c are directed toward the opening, and pass through hole 602d formed by the lancing serve as vent holes.

The cooling fin 602c is bent at 90° to the bottom portion 602 such that the cooling fin 602c is directed toward the opening of the rotor 60.

The rotor frame 60a has embossed portions 602e in the bottom portion 602 between adjacent cooling fins 602c for reinforcing the rotor frame 60a, each with a drain hole 602f for draining water.

In the meantime, as shown in FIG. 7A, the magnet 60b has an arc shape, or as shown in FIG. 9, or the magnet 60b has a 'C' shape (with reference to a substantial 'C' form of a curved portion).

Referring to FIGS. 3B, and 11 to 13, the stator 65 includes an annular helical core 65a of a multiple layer structure of a steel plate with teeth 654a and a base portion 652a wound in a helix starting from a bottom layer to a top layer, an insulator 65b enclosing the core for making insulation, and having a joining portion 655b projected toward an inner side of the core with fastening holes for fastening the stator 65 to the fan housing 40 with fastening members, such as bolts 15c, and a coil 65c wound on the teeth 654a.

In this instance, the joining portion 655b of the stator has more than three projections toward the inner side of the core, and has a height more than 20% of a total height of the core.

Referring to FIG. 11, this is because the height more than 20% of a total height of the core of the joining portion 655b of the insulator is adequate for enduring vibration from the motor if the core has no other joining portion.

In the meantime, the joining portion may have metal tubes 65d, or instead of the metal tubes 65d, spring pins (not shown) each having a longitudinal incision to have radial direction elasticity, respectively inserted in the fastening holes of the joining portion 655b.

The helical core 65a has a multiple layered structure wound in a helix starting from a bottom layer to a top layer, wherein a plurality of the teeth 654a are projected outwardly in a radial direction from the base portion 652a, and the base portion 652a has trapezoidal or rectangular slots 656a for reduction of stress in winding the core.

Multiple layers of the helical core 65a are held together with rivets 657a passed through pass through holes in the base portion 652a, and a winding start portion and a winding end portion of the helical core 65a are welded to predetermined portions of the base portion in contact thereto, respectively.

Referring to FIG. 11, the insulator 65b has separate upper and lower pieces, for enclosing the core as the upper and lower pieces are held together.

In a case the insulator 65b is fabricated as separate upper and lower pieces, the insulator 65b includes an insulator upper 650b secured to an upper side of the core, and an insulator lower 651b secured to a bottom of the core to cover the bottom.

On the other hand, the insulator 65b may be fabricated, not as the separate upper and lower pieces, but fabricated by molding at a time, when the core is processed in a state the core is inserted in a synthetic resin.

The operation and blowing process of the foregoing fan apparatus of the present invention will be described.

When rotation of the rotor 60 is caused as a current flows to the coil 65c of the stator of the BLDC motor 6 in a sequence through a power connection tap housing assembly 300, the shaft 68 engaged to the rotor bushing 70 which is joined with the rotor 60 with serration rotates, to transmit power to the sirocco fan 50 through the shaft 68 to rotate the sirocco fan, causing the air to be drawn through the upper and lower inlets 410a and 410b in the top and bottom of the fan housing 10, and to be discharged through the outlet O in the front of the outside case 10.

In detail, as current is applied to the coil 65c of the stator 65 in the BLDC motor 6, electro-magnetic force is generated between the stator 65 and the magnet 60b, when a sensor keeps detecting a position of the magnet 60b, to apply the current to the coils 65c of the stator 65 in succession, so that the electromagnetic force is kept generating between the stator 65 and the magnet 60b, to rotate the rotor 60 having the magnet 60b secured thereto together with the shaft 68 fixed to the rotor 60, thereby transmitting a rotation force to the sirocco fan 50.

In this instance, since the BLDC motor 6 has a wide range of stable torque characteristic, the BLDC motor 6 can, not only be operated at various rotation speeds, but also reduce noise as the BLDC motor 6 makes stable operation, and moreover, reduce power consumption.

As the sensor for motor control, a hole sensor 200 is used.

In summary, the fan apparatus 1 of the present invention discharges air in a circumferential direction after drawing the air through the bottom air inlet 410a of the fan housing 40 and drawing a portion of the air through the top air inlet 410b of the fan housing 40 when the sirocco fan 50 is rotated by the BLDC motor 6, and the discharged air is guided by the fan housing 40, until the air is discharged through the outlet O in the outside case 10.

In the meantime, the fan apparatus of the present invention has the following advantages.

The employment of the BLDC motor 6 which is stable at most of rotation speeds and has a high efficiency in driving the fan of the fan apparatus 1 enables to drive the BLDC motor while varying the rotation speeds widely, and reduce noise and power consumption as stable and high efficiency operation can be made in an entire rotation speed range.

Moreover, by effective mounting and securing of the BLDC motor 6 at one side of the fan housing having a low suction air flow rate by using separate supporter 80, with a portion of the BLDC motor sunken in the fan housing 40, the fan apparatus 1 of the present invention has an advantage of reducing an overall size of the fan apparatus.

The direct motor coupling type fan apparatus 1 enables to reduce noise, occurrence of faults, and power consumption, and product reliability is enhanced because the bearing housing is formed of metal, such as aluminum, that has no thermal distortion.

Since the rotor 60 of a steel plate of the fan apparatus 1 enables to form by pressing, with a good formability, and short fabrication time period, productivity is improved.

The fan apparatus 1 of the present invention enables easy fabrication of the rotor 60 because the sidewall portion 604, extended vertically from a circumference of the bottom portion 602 of the rotor frame 60a, has a bent portion 604a formed along a circumferential direction having a magnet 60b seating surface, that permits secure supporting of the magnets 60b when the magnets 60b are attached to the inside surface of the rotor.

Moreover, the plurality of radial cooling fins 602c each with a predetermined length around the hub portion 602a of the rotor frame 60a blow air toward the stator, to cool down heat generated at the stator 65.

The cooling fins 602c are formed to direct toward the opening of the rotor 60 by lancing, and the pass through holes 602d formed by the lancing serve as vent holes.

The easy formation of the rotor 60 of a steel plate by one time of pressing enables to shorten a time required for fabrication of the rotor, that improves productivity.

The first outward radial direction bending and the second downward bending of the opening end of the sidewall 604 of the rotor frame 60a enhances strength of the rotor frame 60a, to prevent distortion of the rotor 60 and occurrence of noise caused thereby.

Along with this, the embossed portions 602e between adjacent cooling fins 602c on the bottom portion 602 of the rotor 60 improve an overall strength of the rotor 60, and the drain holes 602f in the embossed portions 602e enable draining of water to an outside of the motor.

The rotor bushing 70 of the present invention of an injection molded synthetic resin having a vibration mode different from the rotor frame 60a of steel plate enables to dampen vibration of the rotor 60 in transmission to the shaft 68.

The helical core 65a which allows easy winding prevents waste of material, and enhances easy fabrication, and rigidity of the stator securing portion 84 of the supporter 80 is increased to reduce noise and vibration, to improve mechanical reliability and lengthen a lifetime.

That is, since the slots 656a in the base portion 652a of the helical core 65a in the stator 65 reduce stress in winding the core, the winding can be done easily with a low power.

Moreover, referring to FIG. 11, the height of the joining portion 655b of the insulator 65b of synthetic resin more than 20% of a total core height permits to have an adequate rigidity even if no metal core present to the joining portion, to prevent breakage of the joining portion 655b caused by vibration occurred during operation of the motor.

Particularly, it is preferable that the joining portion 655b has a height the same with a total height of the core.

Though the height of the joining portion 655b may be higher than the total height of the core, it is preferable that the height of the joining portion 655b is set not to exceed two times of the total height of the core because an excessive height of the joining portion 655b increases a total height of a driving unit of the fan apparatus, which is not favorable for fabricating a compact fan apparatus.

The positioning projections 656b on the joining portion 655b matched to the positioning holes 842 in the supporter 80 enable easy joining of the stator 65.

That is, the present invention permits not only a rigid securing of the stator 65 to the supporter 80, but also effective maintenance of concentricity of the stator.

The fan apparatus 1 of the present invention permits low cost and easy fabrication because the fan housing 40 is formed of a metal plate that is strong against heat, and light.

Furthermore, the fan apparatus 1 of this embodiment can enhance a fan efficiency because the BLDC motor 6 is mounted on a side of the air inlet 410b having a relatively low flow suction rate of the air inlets 410a and 410b of the fan housing 40, that enables, not only to minimize a suction flow resistance, but also high efficiency stable operation.

Figure 17:
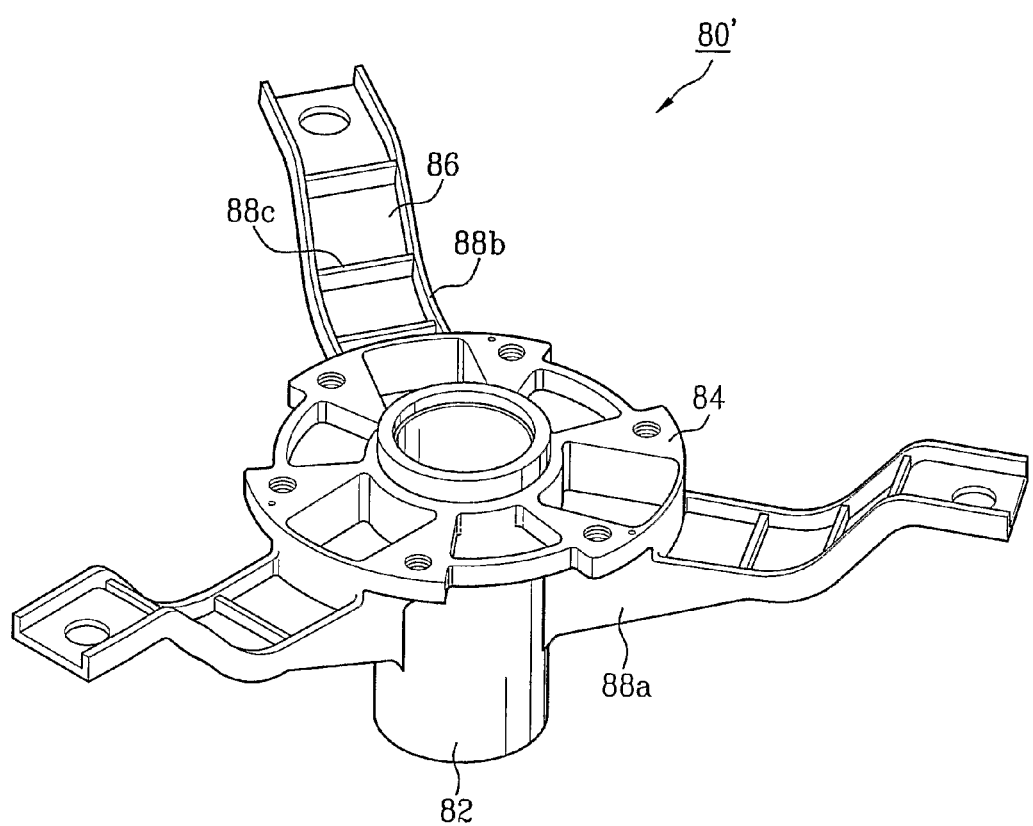
FIG. 17 illustrates a perspective view of another embodiment of a supporter applicable to the present invention.

In the meantime, FIG. 17 illustrates a perspective view of another embodiment of a supporter 80' having a basic configuration identical to the one in FIGS. 4A and 4B, even if a shape thereof is slightly different from the one in FIGS. 4A and 4B.

In this case the reinforcing ribs are different from the reinforcing ribs in FIGS. 4A and 4B. Upon comparing to FIGS. 4A, and 4B, it can be noted that a position of the reinforcing rib 88a is different.

It can be noted that, while FIGS. 4A and 4B illustrate a case when only one reinforcing rib 88a is formed on a center line of a surface of each of the stator securing portions 84, FIG. 17 illustrates a case when the reinforcing ribs 88a are formed on opposite sides of the surface of each of the supporter securing portions 86.

Moreover, though no detailed example is shown, the supporter may only include a bearing housing portion 82 on an inside of shaft supporting bearings, and a stator securing portion 84 extended in a radial direction from the bearing housing portion 82 for securing both the supporter on a top surface of the fan housing 40, and the stator on an opposite side thereof.

That is, this case is a case when the stator securing portion 84 is extended to the supporter securing portions, such that the supporter securing portions 86 are not in a spoke shape, but in a disc shape.

Figure 13:
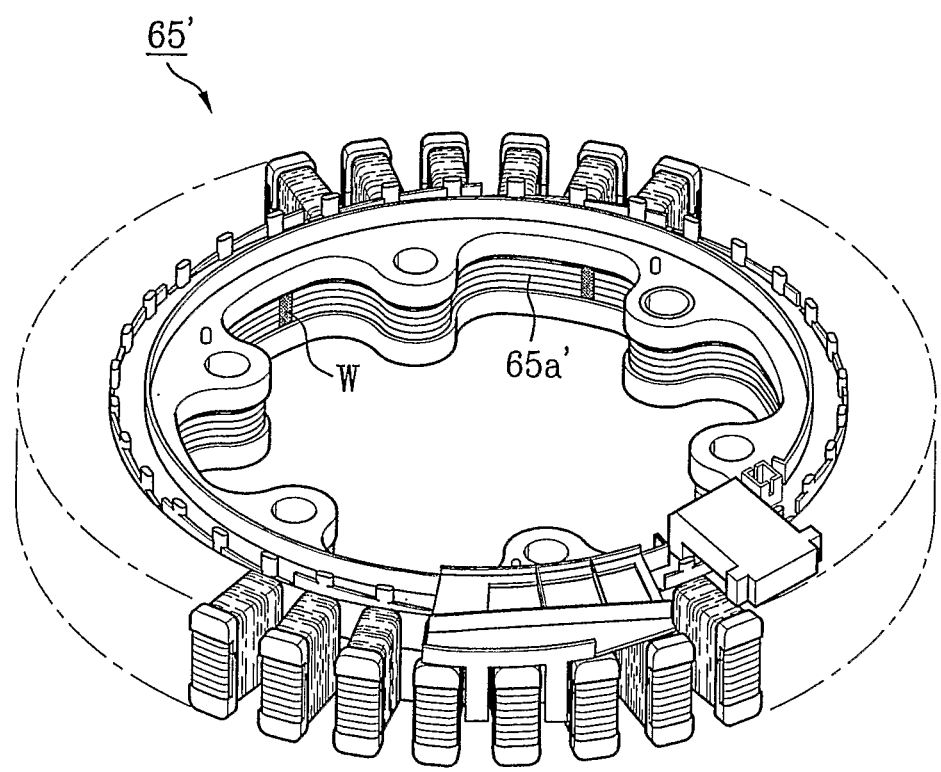
FIG. 13 illustrates a perspective view of another example of a stator applicable to the present invention.
Figure 14:
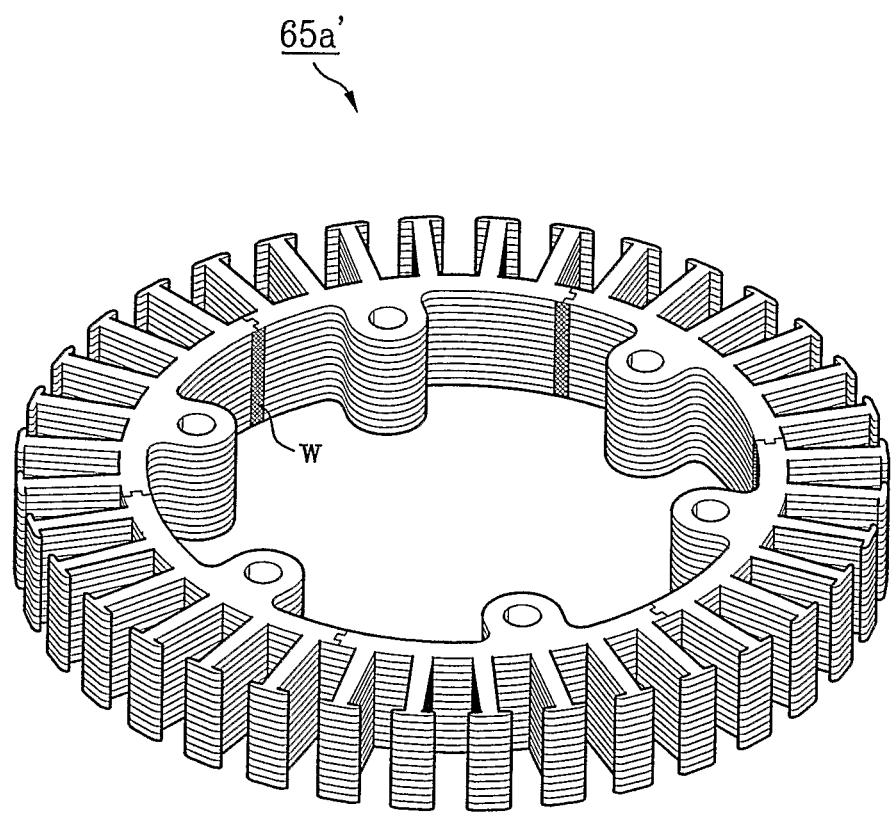
FIG. 14 illustrates a perspective view of a split core, as an example of the core structure in FIG. 13.

In the meantime, FIG. 13 illustrates a perspective view of another example of a stator applicable to the present invention, and FIG. 14 illustrates a perspective view of a split core, as an example of the core structure in FIG. 13. In the case of the stator 65' in FIG. 13, instead of the helical core 65a, a split core is used.

The split core 65a' is fabricated by forming divided core pieces each divided along a circumferential direction on a mother work piece of a steel plate having the teeth 654a and the base portion 652a, and connecting the divided core pieces with welding.

'W' in the drawing denotes a welded portion.

In this case, though an insulator 65b of divided pieces held together is shown, the core may be inserted molded such that the insulator encloses the core, completely.

Figure 15:
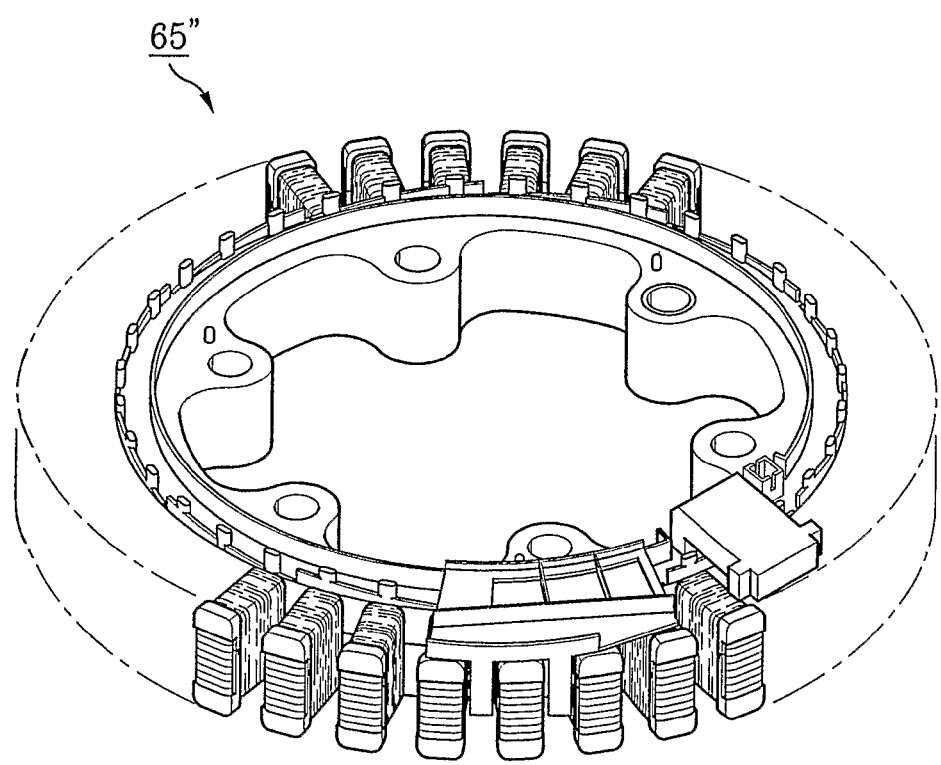
FIG. 15 illustrates a perspective view of another example of a stator applicable to the present invention.
Figure 16:
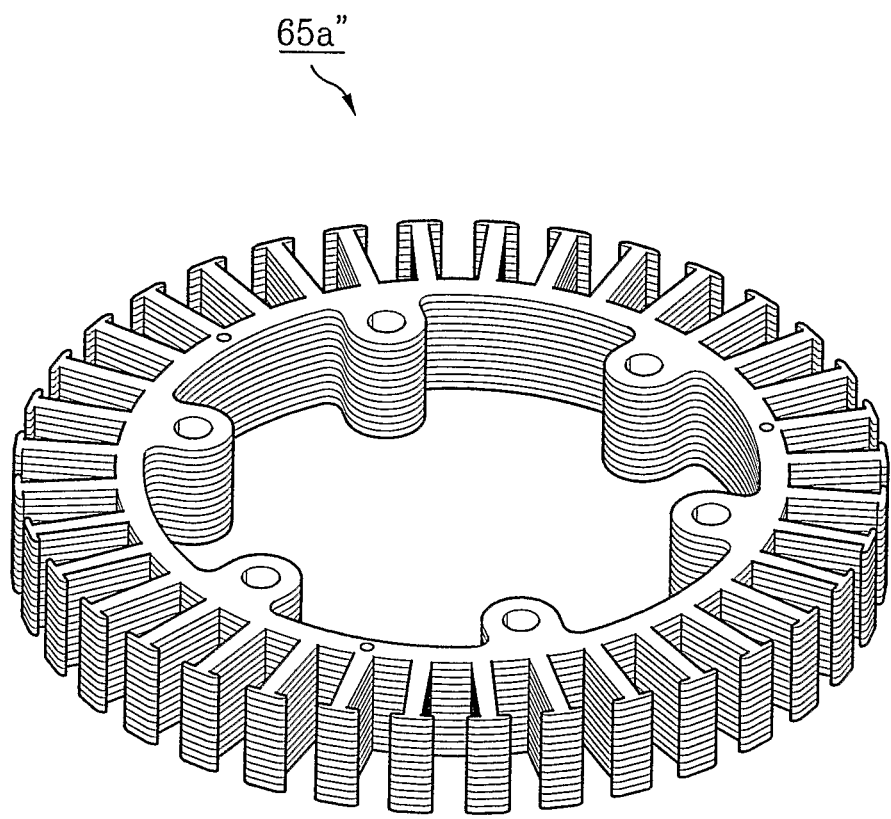
FIG. 16 illustrates a perspective view of a one pieced core, as an example of a core structure in FIG. 15.

In the meantime, FIG. 15 illustrates a perspective view of another example of a stator applicable to the present invention, and FIG. 16 illustrates a perspective view of a one pieced core, as an example of a core structure in FIG. 15, wherein the stator 65" in FIG. 15 illustrates a case of one pieced core 65a" of a steel plate with the teeth 654a and the base portion 652a, having no cut along a circumferential direction, instead of the helical core 65a, or the split core. The one pieced core is illustrated in FIG. 16.

Though FIG. 15 illustrates a case when the core is inserted molded such that the insulator encloses the core completely, the insulator of divided pieces held together as shown in FIG. 14 can be used.

In the meantime, in above embodiment, the sirocco fan 50 is fastened to the shaft 68 so as to be rotatable with the shaft 68 as an end of a bolt passed through the bolt fastening hole 560c is pressed onto the flat section at the outside circumference of the end of the shaft 68. However, not only such a fastening structure enables fastening of the sirocco fan 50 to the shaft 68.

Though not shown, in the same principle of configuration in which the rotor bushing 70 and the shaft 68 passed through a central portion thereof are held together with the bolt 15b, the sirocco fan 50 and the shaft 68 may be held together with a bolt that passes through a central portion of the main plate 54 of the sirocco fan 50, and an end of the shaft 68.

An example of application of the fan apparatus 1 to the air conditioner outdoor unit of the front suction/discharge type will be described with reference to FIGS. 18~20.

Figure 18:
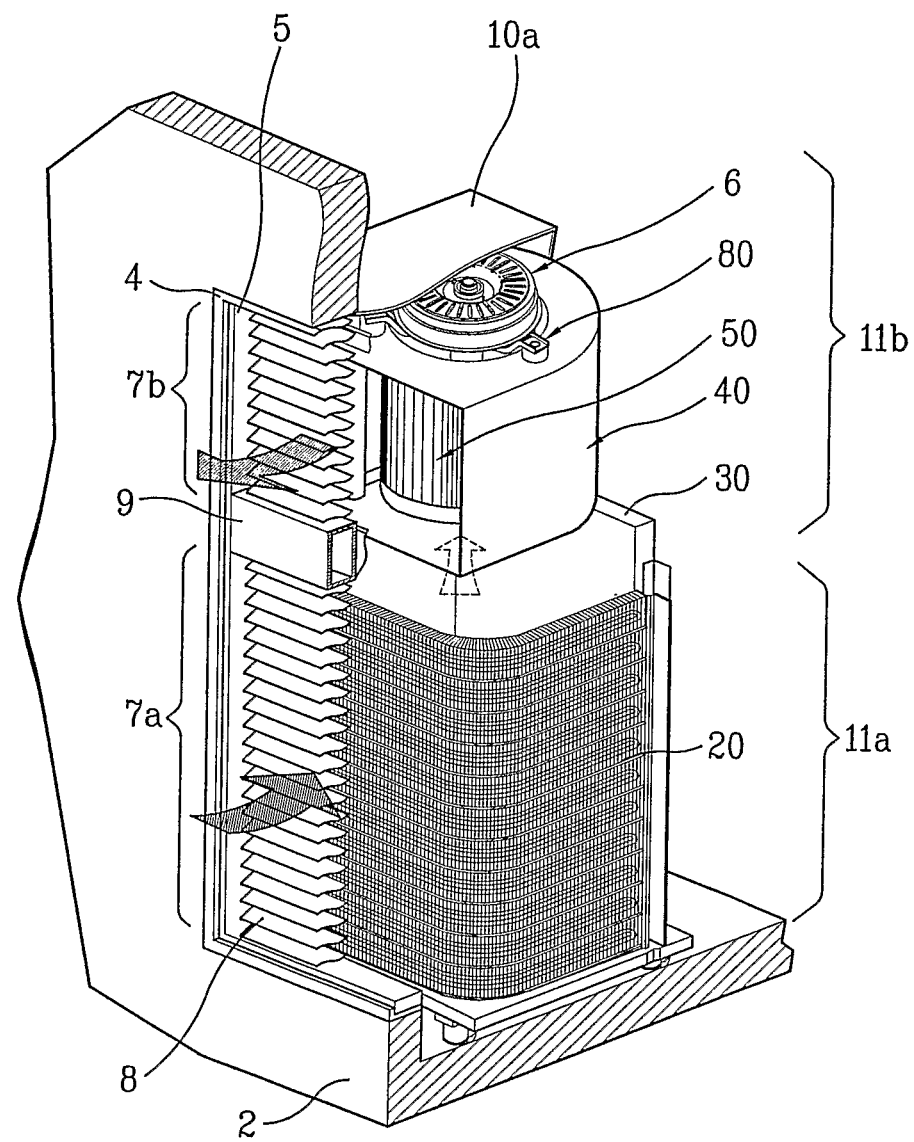
FIG. 18 illustrates a perspective view showing an installation state of an air conditioner outdoor unit of a front suction/discharge type having a fan apparatus of the present invention applied thereto, with a partial cut away view.
Figure 19:
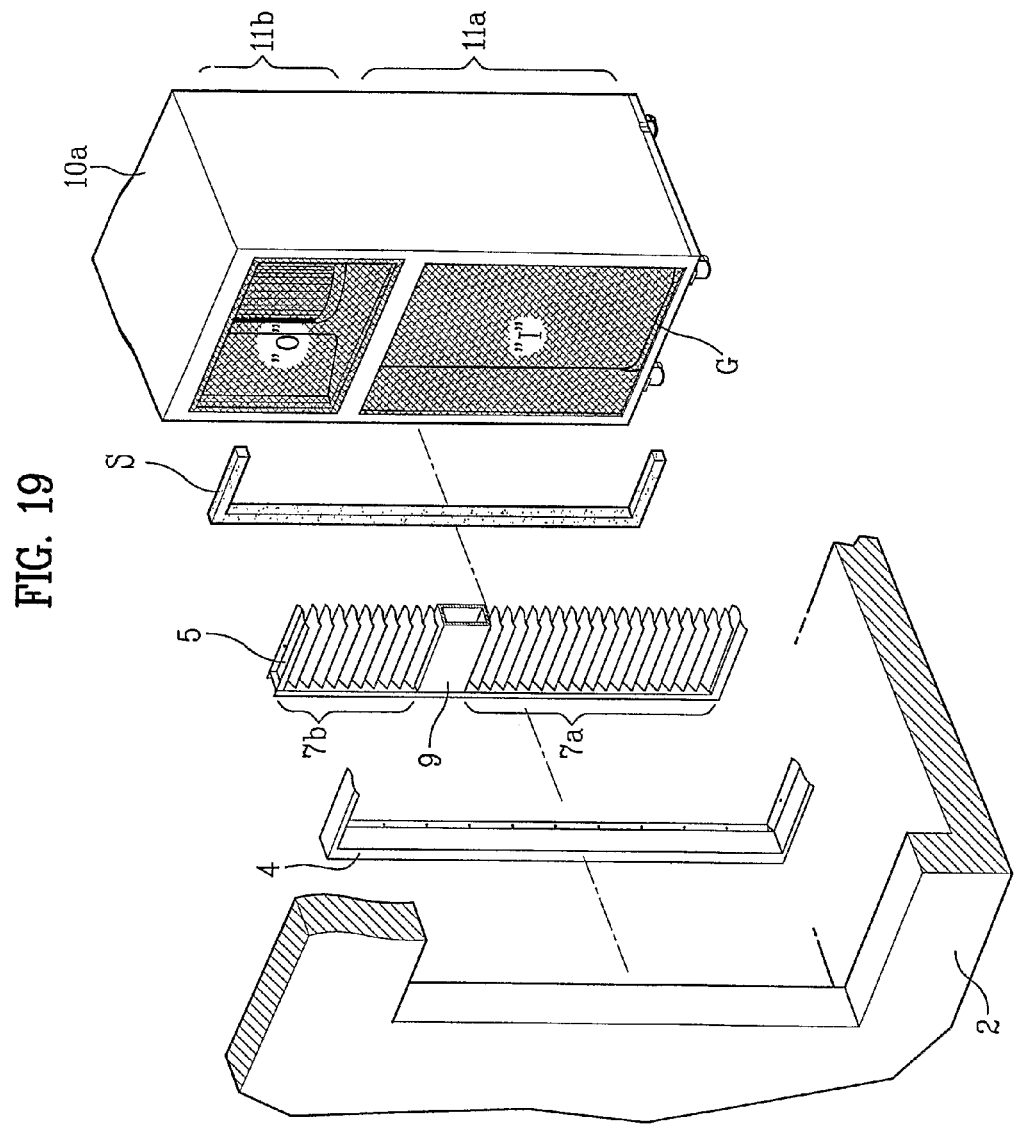
FIG. 19 illustrates a disassembled perspective view showing an installation state of an air conditioner outdoor unit of front suction/discharge type having the fan apparatus of the present invention applied thereto.
Figure 20:
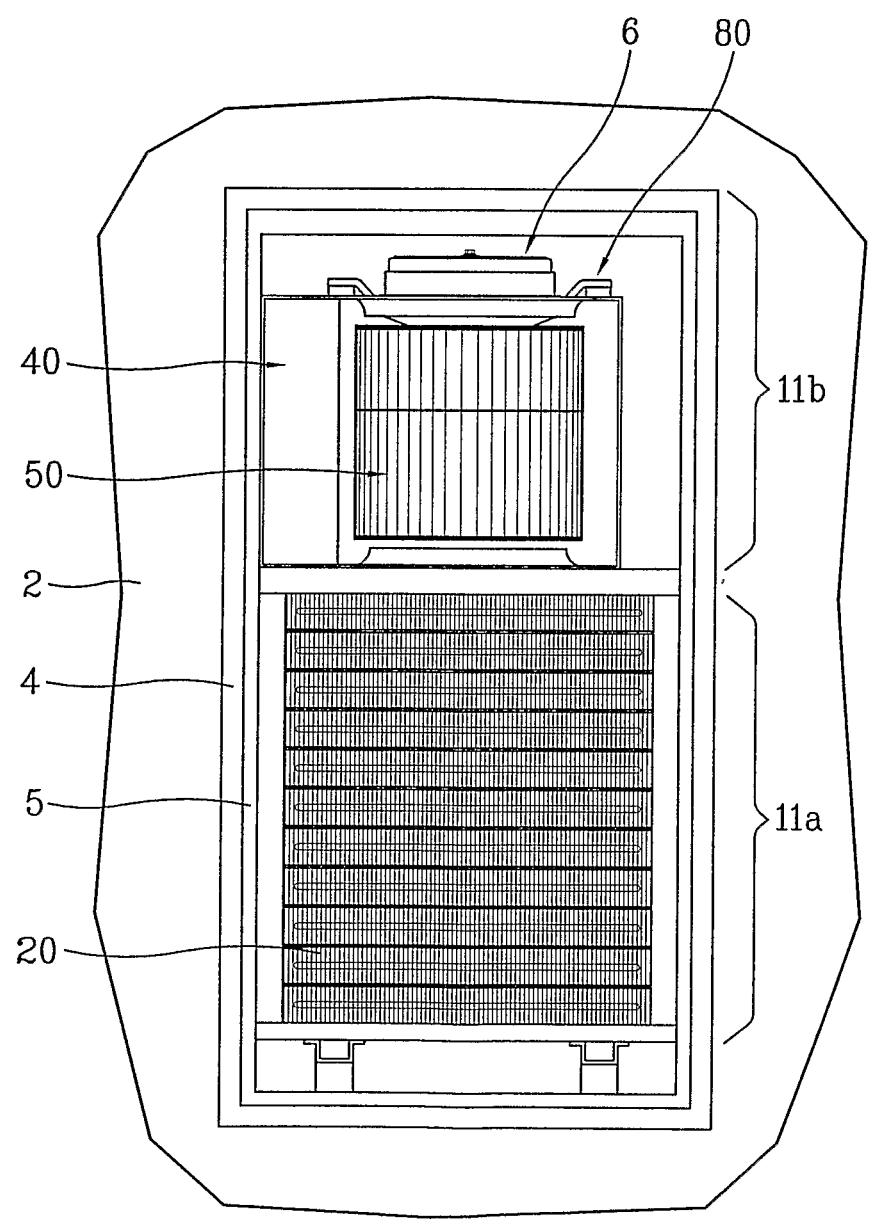
FIG. 20 illustrates a front view showing an installation state of an air conditioner outdoor unit of front suction/discharge type having the fan apparatus of the present invention applied thereto.

FIGS. 18~20 illustrate a perspective view with a partial cut away view, a disassembled perspective view, and a front view showing installation states of the air conditioner outdoor unit of the front suction/discharge type, respectively.

Referring to FIGS. 18~20, the air conditioner outdoor unit of the front suction/discharge type includes a case 10' having an opened front and various parts held therein. The air conditioner outdoor unit of the front suction/discharge type is installed in a rectangular space in an outside wall 2 of a residential or commercial building.

In detail, securely mounted on an inside wall of the space in an outside wall 2 of the building is an outer frame 4, securely mounted on an inside of the outer frame 4 is an inner frame 5 (depending on cases, the outer and inner frames 4, and 5 may be formed as one unit), across a middle of an inside area of the inner frame 5 is a middle isolating bar 9 for dividing the inside area of the inner frame 5 into a inlet area 7a and a outlet area 7b in up/down direction, mounted in each of the areas is a plurality of louver blades 8 for suction/discharge of air between gaps of the blades 8, closely mounted on an inside of the inner frame 5 is the outdoor unit, and between the inner frame 5 and the outdoor unit is sealing member 'S' for preventing leakage of air and damping vibration.

The air conditioner outdoor unit of the front suction/discharge type installed thus includes an inlet 'I' and an outlet 'O' in a lower side and an upper side of the opened front of the case 10a, a compressor (not shown) and a heat exchanger 20 built in on an inner side of the inlet 'I' for compression and condensing refrigerant, and a fan apparatus 1 built in on an inner side of the outlet 'O' for blowing air, wherein the fan apparatus 1 includes a sirocco fan 50, a kind of centrifugal fan, inside of a fan housing 40 securely mounted on an inner side of the outlet 'O' as a fan, and a BLDC motor 6 connected to the sirocco fan and securely mounted on the fan housing 40 with a separate supporter 80 for rotating the sirocco fan 50.

The case 10a includes an inlet portion 11a and an outlet portion 11b in correspondence to the inlet area 7a and the outlet area 7b on inner sides of the inlet 'I' and outlet 'O' respectively, and preferably grills G on the inlet 'I' and the outlet 'O' of the opened front for preventing infiltration of large sized foreign matters, bugs, animals, and the like.

For reference, it can be noted that the case 10a is slightly different from the outside case 10 of the fan apparatus described before, because the case 10a is taken, not only the front suction, but also installation of a heat exchanger, and the like on an inside thereof into account.

Moreover, the case 10a has various units, such as the compressor, and the heat exchanger 20 securely mounted on the inlet portion 11a and the outlet portion 11b with various shapes of brackets (not shown), and the case 10a is mounted such that the opened front of the case 10a is in close contact with the sealing member 'S' at an inside of the inner frame 5.

Of course, the compressor and the heat exchanger 20 are mounted so as to be connected to the heat exchanger (not shown) in the indoor unit with refrigerant pipelines, the other expansion means (not shown), such as capillary tube or expansion valve, are also mounted so as to be connected between the outdoor unit heat exchanger and the indoor unit with refrigerant pipelines. Above configuration enables the refrigerant to cool a space the indoor unit is installed therein as the refrigerant is compressed, condensed, expanded, and evaporated while the refrigerant circulates a refrigerating cycle with the compressor, the outdoor side heat exchanger 20, the expansion means, the indoor side heat exchanger.

The outdoor heat exchanger 20 has a plurality of 'U' bent refrigerant pipes with a plurality of cooling fins 602c fitted thereto, the compressor mounted on an inner side, and a control box 30 on a rear side for controlling operation of various units in the outdoor unit.

The fan apparatus 1 is securely mounted on the outdoor unit heat exchanger 20, wherein, after the sirocco fan 50 and the BLDC motor 6 are connected to each other, the sirocco fan 50 and the BLDC motor 6 are securely mounted inside of the fan housing 40 with the supporter 80, and the fan housing 40 is securely mounted on the outdoor unit heat exchanger 20 so as to be positioned at the outlet 11b of the case 10a with a separate bracket (not shown).

In more detail, the sirocco fan 50 is a kind of centrifugal fan which draws air in an axial direction and discharges the air in a circumferential direction, and has an air flow rate relatively higher than an axial fan.

The sirocco fan 50 has a structure the same with the foregoing embodiment.

Next, the fan housing 40 has air inlets 410a and 410b in top and bottom for drawing air passed through the outdoor side heat exchanger 20 in an axial direction of the sirocco fan 50, preferably with shrouds 44 on the inlets 410a and 410b respectively for guiding the air, and an air outlet for discharging the air in a circumferential direction of the sirocco fan 50.

The air outlet in the fan housing 40 is in communication with the outlet 'O' in the case 10a.

In the meantime, the BLDC motor 6, using, not a brush, but a driving circuit in converting AC to DC, has not sparks occurred and no hazard of gas explosion because the BLDC motor 6 has no brush, makes a stable driving in most of speed range, and has a high efficiency in a range of 70~80%. In detail, the BLDC motor 6 includes a shaft 68 for transmission of power to the sirocco fan, a stator 65, a rotor 60, and magnets 60b for generating rotating force by electromagnetic force to drive the shaft 68, and a hole sensor 200 for detecting a position of the rotor 60, for controlling a current supplied thereto.

Particularly, the BLDC motor 6 is securely mounted on a side of the top air inlet 410b of the fan housing 40 having a relatively low flow rate with the supporter 80 for reducing suction flow resistance.

In more detail, the shaft 68 is rotatably mounted supported on the supporter 80 with bearings 69a and 69b, such as ball bearings, in a state the shaft 68 is passed through the supporter 80, with an end thereof coupled to an upper shaft center of the sirocco fan 50 by bolt fastening, or caulking, and the stator 65 is securely mounted on the supporter 80, with a predetermined gap to an outside circumference of the shaft 68.

Along with this, the rotor 60 has an outside circumferential portion positioned around an outside circumference of the stator 65, and an inside circumference portion securely mounted on the shaft 68, wherein the rotor has a plurality of ribs, or embossed portions on a bottom extended in a radial direction for reinforcement against centrifugal force, a plurality of the permanent magnets 68 are securely mounted on an outside circumferential portion of the rotor 60 along a circumferential direction at regular intervals for generating electromagnetic force with the stator 65, and the hole sensor 200 is securely mounted on a core side of the stator 65.

Therefore, if a current flows to the coils 65c of the stator 65 in succession, the rotor 60 rotates by electromagnetic force between the current in the coil and the magnet 60b, and the rotation force of the rotor 60 rotates the sirocco fan 50 though the shaft 68.

Next, the supporter 80 mounts the sirocco fan 50 and the BLDC motor 6 hung from the fan housing 40 in an inside thereof. In detail, the supporter 80 includes a cylindrical bearing housing portion 72 having the shaft 68 rotatably mounted thereon by the bearings 69a and 69b, a stator securing portion 84 formed as one unit with the bearing housing portion 72 at an upper end thereof for securely mounting the stator 65 in a state the stator 65 is placed thereon, and a plurality of supporter securing portions 86 projected in a radial direction from a circumference of the stator securing portion 84 at regular intervals and fastened to a periphery of the air inlet 410b in the top of the fan housing 40.

The bearing housing portion 72 of a cylindrical shape with a length shorter than the shaft 68 has the bearings 69a and 69b for rotatably supporting the shaft 68, and the stator securing portion 84 has a plurality of positioning holes 842 and fastening holes 846 for fastening screws in a state the stator 65 is inserted in an upper surface thereof.

Along with this, it is preferable that the supporter 80 has three supporter securing portions 86 around the bearing housing portion 82 and the stator securing portion 84 at 120° intervals for spreading load thereon, and a reinforcing rib 88a is formed between the bearing housing portion, the stator securing portion 84, and the supporter securing portion 86 for supporting an underside of the stator securing portion 84 and the supporter securing portion 84 to reinforce a strength of the supporter securing portion 86, and it is more preferable that a plurality of supplementary reinforcing ribs 88b and 88c are formed on upper sides of the supporter securing portions, too.

Particularly, the supporter securing portions 86 are projected in a radial direction from the stator securing portion 84, and have middle portions each sloped upward the more as it goes toward the radial direction the farther, and horizontal end portions having a vibration damping member securing hole 866. Accordingly, the supporter 80 is mounted such that the supporter securing portions 86 are fastened to a periphery of the air inlet 410b in a top of the fan housing 40.

A process for assembling the fan apparatus, a main unit of the present invention, and the operation of the outdoor unit will be described.

First, the BLDC motor 6 forms a motor assembly as the shaft 68 is rotatably mounted on the bearing housing portion 82 of the supporter 80 with the bearings 69a and 69b and the stator 65 is secured to the upper surface of the stator securing portion 84 with screws, and the motor assembly is mounted such that the shaft 68 is coupled to a shaft center of the sirocco fan 50 in a state the sirocco fan 50 is positioned inside of the fan housing 40, and the supporter 80 is mounted on the fan horsing as the supporter securing portions 86 of the supporter 80 are placed on, and fastened to, the periphery of the top air inlet 410*b* on the upper surface of the fan housing with bolts or the like.

Accordingly, the fan apparatus 1 having the BLDC motor 6 thereon is securely mounted on the outdoor heat exchanger 20 with a separate bracket in a state the fan apparatus 1 is placed thereon, and the BLDC motor 6 is connected to the control box 30 with wires for controlling operation of the BLDC motor 6.

With regard to the operation of the outdoor unit assembled thus, the compressor is operated in response to a signal from the control box 30, according to which the refrigerant is introduced into the indoor unit through the compressor, the outdoor heat exchanger 20, and the expansion means, and circulated along the indoor heat exchanger.

In this instance, since the refrigerant circulates through the outdoor heat exchanger 20, and the sirocco fan 50 is driven by the BLDC motor 6, the air drawn through the inlet 'I' in the case 10*a* makes heat exchange with the refrigerant as the air passes through the outdoor heat exchanger 20, to condense the refrigerant, and passes the sirocco fan 50, and is discharged through the outlet 'O' in the case 10*a*.

Of course, because the BLDC motor 6 has a wide range of stable torque characteristic, the BLDC motor 6 can make stable operation in a variety of speeds, enabling reduction of noise, and power consumption.

According to this, since the sirocco fan 50, a kind of centrifugal fan, draws air in an axial direction by driving such a BLDC motor 6, most of the air passed through the outdoor heat exchanger 20 is drawn through the bottom air inlet 410*a* of the fan housing 40, and rest portion of the air is drawn through the top air inlet 410*b*, and the air is guided by the shrouds 44 on the air inlets 410*a* and 410*b* to flow in an axial direction of the sirocco fan 50 and discharged in a circumferential direction, and, therefrom is guided by the fan housing 40 and discharged through the outlet 'O' in the case 10*a* in communication with the air outlet in the fan housing.

Since the BLDC motor 6 is mounted on a side of the air inlet 410*b* which has a lower air flow rate relatively of the air inlets 410*a* and 410*b* of the fan housing 40, not only a suction flow resistance can be minimized, but also fan efficiency and heat exchange efficiency can be enhanced as the BLDC motor makes stable operation at a high efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

As has been described, the fan apparatus for an air conditioner of the present invention permits to drive the BLDC motor while varying a speed of the motor widely, and to reduce noise, and power consumption, because the BLDC motor is applied for driving the fan, which can make stable operation in most of rotation speeds and has a high efficiency.

Moreover, since the fan apparatus of the present invention permits effective mounting of the BLDC motor in the fan housing, with a portion of the BLDC motor sunken in an inside of the fan housing, an overall size of the fan apparatus can be reduced.

What is claimed is:

1. A fan apparatus for an air conditioner comprising:
a fan;
a shaft coupled to the fan;
a rotor for transmission of driving force to the shaft for rotating the fan;
a stator on an inside of the rotor to form a brushless direct current (BLDC) motor together with the rotor;
a fan housing for enclosing the fan;
a supporter secured to an upper surface of the fan housing, for supporting the stator such that the supporter allows a portion of the BLDC motor to be sunken in the fan housing; and
a rotor bushing, the supporter including:
a bearing housing portion having bearings mounted therein for supporting the shaft,
supporter securing portions each extended outwardly in a radial direction from the bearing housing portion for securing the supporter to a top of the fan housing, and
a stator securing portion formed so as to join the supporter securing portions to form a surface for securing the stator thereto,
wherein the supporter is bent toward a top portion of the fan housing such that an end of each of the supporter securing portions are positioned above a stator fastening surface, for positioning at least the stator fastening surface of the supporter inside of the fan housing when the supporter is mounted on the fan housing,
wherein the rotor bushing is located between the rotor and the shaft for transmission of driving force from the rotor to the fan,
wherein the rotor bushing includes:
a tooth portion at a center portion for inserting and engagement with the shaft, and
a joining portion that extends in a radial direction from a circumference of the tooth portion for fastening to the rotor frame, wherein the rotor includes a rotor frame, the rotor frame includes a bottom portion of a disc shape having a hub portion having a pass through hole at a central portion for passing of fastening members and fasten the rotor to the shaft and positioning holes for positioning the rotor bushing in mounting the rotor bushing on the rotor formed around the pass through hole in the hub portion at regular intervals, and
fastening holes in the joining portion along a circumferential direction in correspondence to the fastening holes in the hub portion of the rotor frame, and
positioning projections formed as a unit with the rotor bushing between the fastening holes for automatic alignment of the fastening holes in the rotor frame and the rotor bushing respectively as the positioning projections are inserted in the positioning holes in the rotor.

2. The fan apparatus as claimed in claim 1, wherein the rotor further includes:
a plurality of magnets.

3. The fan apparatus as claimed in claim 1, wherein the rotor frame is formed of a steel plate.

4. The fan apparatus as claimed in claim 1, wherein the rotor frame is formed of an injection molded material.

5. The fan apparatus as claimed in claim 1, wherein the rotor frame is formed of a steel plate and an injection molded material enclosing an outside of the steel plate.

6. The fan apparatus as claimed in claim 3, wherein the rotor frame includes:
a sidewall portion that extends substantially in a vertical direction from a circumference of the bottom portion, wherein the sidewall portion that extends from the bottom portion includes a bent portion having a seating surface along a circumferential direction for supporting magnets mounted on an inside surface of the sidewall portion.

7. The fan apparatus as claimed in claim 6, wherein the rotor frame is made from a one-time pressed steel plate.

8. The fan apparatus as claimed in claim 6, wherein the rotor frame includes:
a plurality of radial cooling fins around the hub portion for blowing air toward the stator when the rotor is rotated for cooling the stator, wherein each of the cooling fins is located radially in a circumferential direction and has a predetermined length.

9. The fan apparatus as claimed in claim 8, wherein the cooling fins are configured to direct toward an opening side of the rotor and a plurality of pass holes serving as vent holes are located between adjacent fins.

10. The fan apparatus as claimed in claim 9, wherein the cooling fins are bent at 90°.

11. The fan apparatus as claimed in claim 8, wherein the rotor frame includes:
embossed portions between adjacent cooling fins on the bottom portion for reinforcing a strength of the rotor frame.

12. The fan apparatus as claimed in claim 11, wherein the embossed portion includes a drain hole for draining water.

13. The fan apparatus as claimed in claim 1, wherein the rotor bushing is coupled with the rotor frame in a state the rotor bushing is positioned on an inside of the rotor frame.

14. The fan apparatus as claimed in claim 1, wherein the rotor bushing is coupled with the rotor frame in a state the rotor bushing is positioned on an outside of the rotor frame.

15. The fan apparatus as claimed in claim 1, wherein the tooth portion includes a serration on an inside circumferential surface of the center portion thereof for inserting in and engagement with the shaft.

16. The fan apparatus as claimed in claim 15, wherein the rotor bushing includes reinforcing ribs on the tooth portion or the joining portion.

17. The fan apparatus as claimed in claim 1, wherein the rotor bushing is formed of synthetic resin.

18. The fan apparatus as claimed in claim 6, wherein the rotor frame includes fastening holes for fastening the rotor bushing coupled to an end portion of the shaft opposite to a side the fan is coupled thereto, and positioning holes for positioning the rotor bushing in mounting the rotor bushing on the rotor formed around the pass through hole in the hub portion at regular intervals.

19. The fan apparatus as claimed in claim 18, wherein the shaft includes serration on an outside circumferential surface of an end portion of the shaft opposite to a side the fan is connected thereto, and the serration on the shaft engages with the serration on the rotor bushing.

20. The fan apparatus as claimed in claim 1, wherein the stator includes:
a core of a magnetic material for forming a path of a magnetic flux,
an insulator for enclosing the core to make insulation, and
a plurality of coils each wound on a corresponding one of a plurality of teeth on the core.

21. The fan apparatus as claimed in claim 20, wherein the core is one pieced core of a steel plate having the plurality of teeth and a base portion, the steel plate being continuous along a circumferential direction without discontinuity.

22. The fan apparatus as claimed in claim 20, wherein the core is a split core comprising core pieces each divided but connected to each other, along a circumferential direction on a mother work piece of a steel plate having the plurality of teeth including a base portion.

23. The fan apparatus as claimed in claim 20, wherein the core is a multiple layered annular helical core of a steel plate wound in a helix from a bottom layer to a top layer, the steel plate having the teeth and a base portion.

24. The fan apparatus as claimed in claim 20, wherein the insulator is an insert molded material.

25. The fan apparatus as claimed in claim 20, wherein the insulator includes:
an upper piece mounted on an upper portion of the core, and
a lower piece mounted to enclose a lower portion of the core.

26. The fan apparatus as claimed in claim 1, wherein the stator includes:
a multiple layered annular helical core of a steel plate wound in a helix from a bottom layer to a top layer, the steel plate having a plurality of teeth and a base portion,
an insulator mounted on the core to enclose the core, having a joining portion projected toward an inner side of the core, the joining portion having fastening holes for fastening the stator to the fan housing, and
a plurality of coils each wound on a corresponding one of the plurality of teeth.

27. The fan apparatus as claimed in claim 26, wherein the joining portion on the stator includes at least three projections toward the inner side of the core.

28. The fan apparatus as claimed in claim 27, wherein the joining portion has a height higher than at least 20% of a total height of the core.

29. The fan apparatus as claimed in claim 26, wherein the joining portion includes metal tubes respectively inserted in the fastening holes of the joining portion.

30. The fan apparatus as claimed in claim 26, wherein the joining portion includes spring pins respectively inserted in the fastening holes of the joining portion.

31. The fan apparatus as claimed in claim 1, wherein the fan housing is a metal plate or plastic.

32. The fan apparatus as claimed in claim 31, wherein the fan housing has the stator of the BLDG motor securely mounted on one side thereof.

33. The fan apparatus as claimed in claim 26, wherein the helical core of a multiple layered structure wound in a helix from a bottom layer to a top layer includes:
a plurality of teeth projected in a radial direction outwardly from a base portion of the helical core, and
a plurality of slots in the base portion of the helical core for reduction of stress.

34. The fan apparatus as claimed in claim 33, wherein the multiple layers of the helical core is held together with rivets that pass through pass through holes in the base portion.

35. The fan apparatus as claimed in claim 33, wherein the helical core has a winding start portion and a winding end portion welded to predetermined portions of the base portion in contact thereto, respectively.

36. The fan apparatus as claimed in claim 33, wherein the slot is rectangular or trapezoidal.

37. The fan apparatus as claimed in claim 1, wherein the fan is a sirocco fan.

38. A fan apparatus for an air conditioner comprising:
a fan;
a shaft coupled to the fan;
a rotor for transmission of driving force to the shaft for rotating the fan, the rotor having a rotor frame of a steel plate and magnets;

a stator on an inside of the rotor to form a brushless direct current (BLDG) motor together with the rotor;

a fan housing for enclosing the sirocco fan; and a supporter secured to an upper surface of the fan housing, for supporting the stator such that the supporter allows a portion of the BLDC motor to be sunken in the fan housing, the supporter including:
- a bearing housing portion having bearings mounted therein for supporting the shaft,
- supporter securing portions each extended outwardly in a radial direction from the bearing housing portion for securing the supporter to a top of the fan housing, and
- a stator securing portion formed so as to join the supporter securing portions to form a surface for securing the stator thereto, wherein the supporter is bent toward a top portion of the fan housing such that an end of each of the supporter securing portions are positioned above a stator fastening surface, for positioning at least the stator fastening surface of the supporter inside of the fan housing when the supporter is mounted on the fan housing, wherein the rotor frame includes:
- a disc shaped bottom portion,
- a sidewall portion that extends substantially in a vertical direction from a circumference of the bottom portion, wherein the sidewall portion that extends from the bottom portion includes a bent portion having a seating surface along a circumferential direction for supporting magnets mounted on an inside surface of the sidewall portion, and the bottom portion includes a hub portion at a center thereof, with a pass through hole for enabling passing of fastening members for fastening the rotor to the shaft,
- fastening holes for fastening the rotor bushing coupled to an end portion of the shaft opposite to a side the fan is coupled thereto, and
- positioning holes for positioning the rotor bushing in mounting the rotor bushing on the rotor formed around the pass through hole in the hub portion at regular intervals.

39. The fan apparatus as claimed in claim 38, wherein the shaft includes serration on an outside circumferential surface of an end portion of the shaft opposite to a side the fan is connected thereto, and the rotor bushing includes serration on an inside circumferential surface of the hub, for engagement with the serration on the shaft.

40. The fan apparatus as claimed in claim 38, further comprising a rotor bushing between the rotor and the shaft for transmission of driving force from the rotor to the fan,
wherein the rotor bushing includes:
- fastening holes in the joining portion along a circumferential direction in correspondence to the fastening holes in the hub portion of the rotor frame, and
- positioning projections formed as a unit with the rotor bushing between the fastening holes for automatic alignment of the fastening holes in the rotor frame and the rotor bushing respectively as the positioning projections are inserted in the positioning holes in the rotor.

41. The fan apparatus as claimed in claim 40, wherein the rotor bushing includes:
- a tooth portion at a center portion for inserting and engagement with the shaft, and
- a joining portion that extends in a radial direction from a circumference of the tooth portion for fastening to the rotor frame.

* * * * *